United States Patent
Takashima

(10) Patent No.: US 12,284,436 B2
(45) Date of Patent: Apr. 22, 2025

(54) IMAGING APPARATUS AND CONTROL DEVICE FOR NOTIFYING A CHANGE IN A STATE OF THE IMAGING APPARATUS TO THE CONTROL DEVICE

(71) Applicant: Panasonic Intellectual Property Management Co., Ltd., Osaka (JP)

(72) Inventor: Toru Takashima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/081,213

(22) Filed: Dec. 14, 2022

(65) Prior Publication Data
US 2023/0199303 A1 Jun. 22, 2023

(30) Foreign Application Priority Data

Dec. 17, 2021 (JP) .................................. 2021-205227
Oct. 28, 2022 (JP) .................................. 2022-173601

(51) Int. Cl.
*H04N 23/66* (2023.01)

(52) U.S. Cl.
CPC .................................. *H04N 23/66* (2023.01)

(58) Field of Classification Search
CPC ...... H04N 23/66; H04N 23/62; H04N 23/632; H04N 23/67; H04N 23/73; H04N 23/75; H04N 23/76; H04N 23/661
See application file for complete search history.

(56) References Cited

U.S. PATENT DOCUMENTS

| | | | | |
|---|---|---|---|---|
| 7,113,971 | B1* | 9/2006 | Ohi | H04N 23/661 348/211.3 |
| 8,466,968 | B2* | 6/2013 | Takagi | H04N 23/661 348/207.1 |
| 10,212,326 | B2* | 2/2019 | Leung | G06F 9/52 |
| 10,609,280 | B2* | 3/2020 | Ahn | H04N 23/62 |
| 2002/0063781 | A1 | 5/2002 | Aizawa | |
| 2015/0116522 | A1 | 4/2015 | Tsunoda et al. | |
| 2016/0292509 | A1* | 10/2016 | Kaps | G06V 40/23 |

(Continued)

FOREIGN PATENT DOCUMENTS

| | | | |
|---|---|---|---|
| CN | 101039408 A | * | 9/2007 |
| JP | 2002-133406 A | | 5/2002 |

(Continued)

OTHER PUBLICATIONS

Office Action for corresponding Japanese Application No. 2021-205227 issued Jan. 24, 2023.

*Primary Examiner* — Timothy J Henn
(74) *Attorney, Agent, or Firm* — Renner, Otto, Boisselle & Sklar, LLP

(57) ABSTRACT

An imaging apparatus configured to notify an external control device of information in the imaging apparatus, the imaging apparatus includes: a communication circuitry configured to perform data communication with the control device; and a control circuitry configured to generate notification data in response to an event and control the communication circuitry to transmit the notification data to the control device, the event indicating that a state in the imaging apparatus changes, wherein the notification data includes a data storage region capable of storing data indicating each state in a plurality of types of events.

11 Claims, 26 Drawing Sheets

(56) References Cited

U.S. PATENT DOCUMENTS

2018/0103192 A1* 4/2018 Iwasaki ................ H04N 23/661
2022/0094839 A1* 3/2022 Mizobuchi ........... H04N 23/667

FOREIGN PATENT DOCUMENTS

| JP | 2007-102774 A | 4/2007 |
| JP | 2012-085125 A | 4/2012 |
| JP | 2015-088937 A | 5/2015 |
| JP | 2017-050639 A | 3/2017 |
| JP | 2020-014105 A | 1/2020 |

* cited by examiner

Fig. 7

| SETTING DATA | | | |
|---|---|---|---|
| ITEM | | | VALUE |
| NUMBER OF SET EVENT | | | 6 |
| EVENT GROUP 1 | EVENT GROUP CODE | | 0xC000 |
| | NOTIFICATION EVENT TAG 1 | TAG DEFINITION | 0x00000001 (ISO SENSITIVITY) |
| | | MAX DATA SIZE | 4 (BYTES) |
| | NOTIFICATION EVENT TAG 2 | TAG DEFINITION | 0x00000002 (SHUTTER SPEED) |
| | | MAX DATA SIZE | 4 (BYTES) |
| | NOTIFICATION EVENT TAG 3 | TAG DEFINITION | 0x00000003 (APERTURE VALUE) |
| | | MAX DATA SIZE | 2 (BYTES) |
| EVENT GROUP 2 | EVENT GROUP CODE | | 0xC010 |
| | NOTIFICATION EVENT TAG 1 | TAG DEFINITION | 0x00000011 (NUMBER OF PICTURES CAN BE SHOT) |
| | | MAX DATA SIZE | 4 (BYTES) |
| | NOTIFICATION EVENT TAG 2 | TAG DEFINITION | 0x00000012 (AVAILABLE VIDEO RECORDING TIME) |
| | | MAX DATA SIZE | 4 (BYTES) |
| | NOTIFICATION EVENT TAG 3 | TAG DEFINITION | 0x00000013 (ELAPSED VIDEO RECORDING TIME) |
| | | MAX DATA SIZE | 4 (BYTES) |
| EVENT GROUP 3 | EVENT GROUP CODE | | 0x0000 (UNUSED) |

| SETTING DATA | | | | D11 |
|---|---|---|---|---|
| ITEM | | | VALUE | |
| NUMBER OF SET EVENT | | | 6 | |
| EVENT GROUP 1 | EVENT GROUP CODE | | 0xC000 | |
| | NOTIFICATION EVENT TAG 1 | TAG DEFINITION | 0x00000001(ISO SENSITIVITY) | |
| | | MAX DATA SIZE | 4(BYTES) | |
| | NOTIFICATION EVENT TAG 2 | TAG DEFINITION | 0x00000002(SHUTTER SPEED) | |
| | | MAX DATA SIZE | 4(BYTES) | |
| | NOTIFICATION EVENT TAG 3 | TAG DEFINITION | 0x00000000(UNUSED) | |
| | | MAX DATA SIZE | 0(BYTES) | |
| EVENT GROUP 2 | EVENT GROUP CODE | | 0xC010 | |
| | NOTIFICATION EVENT TAG 1 | TAG DEFINITION | 0x00000012(AVAILABLE VIDEO RECORDING TIME) | |
| | | MAX DATA SIZE | 4(BYTES) | |
| | NOTIFICATION EVENT TAG 2 | TAG DEFINITION | 0x00000013(ELAPSED VIDEO RECORDING TIME) | |
| | | MAX DATA SIZE | 4(BYTES) | |
| | NOTIFICATION EVENT TAG 3 | TAG DEFINITION | 0x00000000(UNUSED) | |
| | | MAX DATA SIZE | 0(BYTES) | |
| EVENT GROUP 3 | EVENT GROUP CODE | | 0xC020 | |
| | NOTIFICATION EVENT TAG 1 | TAG DEFINITION | 0x00000051(SETTING MENU INFORMATION) | |
| | | MAX DATA SIZE | 2(BYTES) | |
| | NOTIFICATION EVENT TAG 2 | TAG DEFINITION | 0x00000000(UNUSED) | |
| | | MAX DATA SIZE | 0(BYTES) | |
| | NOTIFICATION EVENT TAG 3 | TAG DEFINITION | 0x00000000(UNUSED) | |
| | | MAX DATA SIZE | 0(BYTES) | |

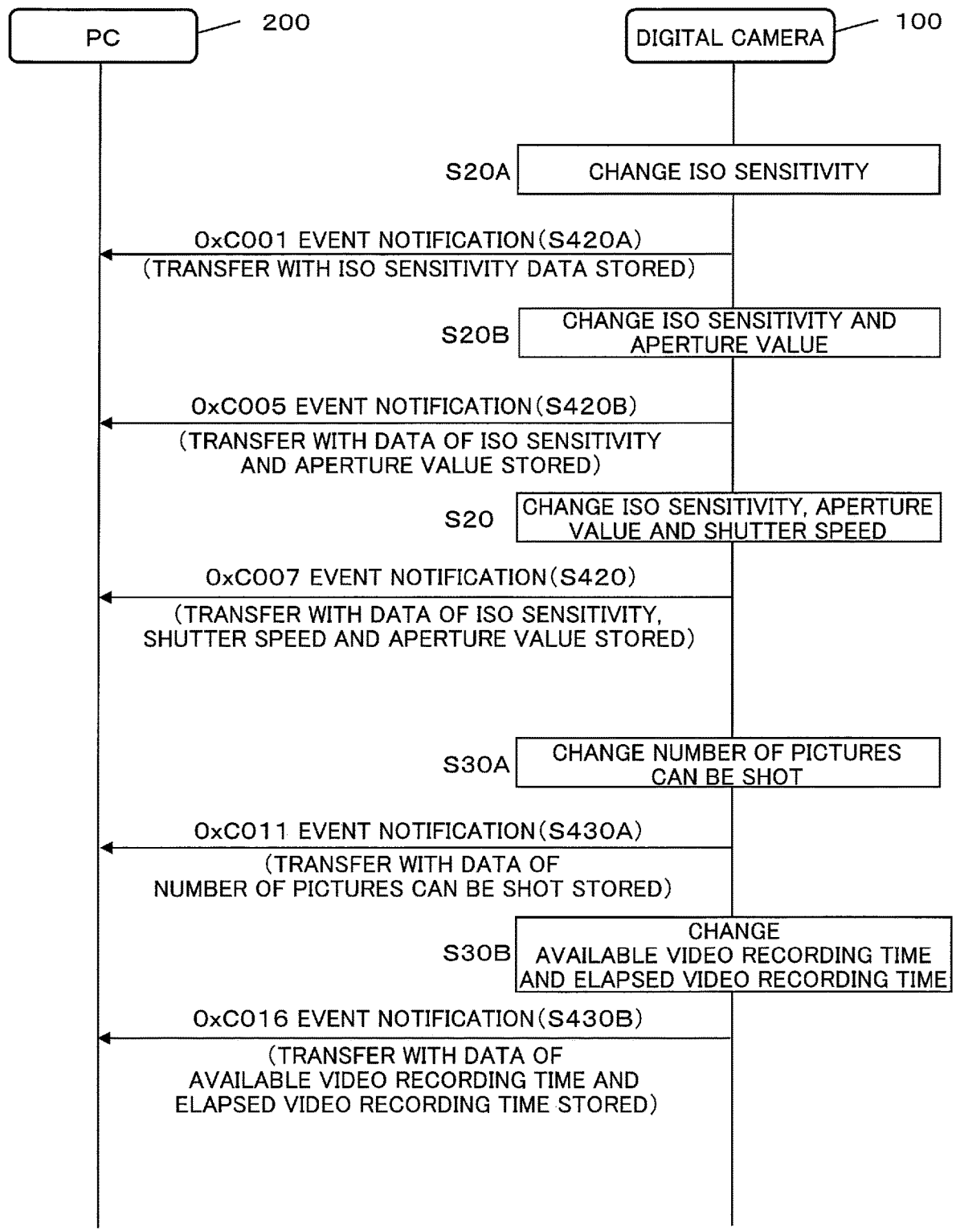

| NOTIFICATION DATA | |
|---|---|
| EVENT CODE | 0xC001 |
| PARAMETER 1 | 0x00000064 (ISO SENSITIVITY : 100) |
| PARAMETER 2 | 0x00000000 (SHUTTER SPEED : NOTIFICATION DISABLED) |
| PARAMETER 3 | 0x0000 (APERTURE VALUE : NOTIFICATION DISABLED) |

| NOTIFICATION DATA | |
|---|---|
| EVENT CODE | 0xC007 |
| PARAMETER 1 | 0x00000064 (ISO SENSITIVITY : 100) |
| PARAMETER 2 | 0x000000C8 (SHUTTER SPEED : 1/200) |
| PARAMETER 3 | 0x0018 (APERTURE VALUE : F24) |

| NOTIFICATION DATA | |
|---|---|
| EVENT CODE | 0xC016 |
| PARAMETER 1 | 0x00000000 (NUMBER OF PICTURES CAN BE SHOT : NOTIFICATION DISABLED) |
| PARAMETER 2 | 0x000003E8 (AVAILABLE VIDEO RECORDING TIME : 1000 SEC.) |
| PARAMETER 3 | 0x0000000A (ELAPSED VIDEO RECORDING TIME : 10 SEC.) |

Fig. 13A

| COMMAND FOR ACQUIRING EVENT DATA | D21a |
|---|---|
| PARAMETER 1 | 0xC000(ALL DATA FOR EVENT GROUP 1) |
| PARAMETER 2 | 0xC010(ALL DATA FOR EVENT GROUP 2) |
| PARAMETER 3 | 0x0000(UNUSED) |

Fig. 13B

| COMMAND FOR ACQUIRING EVENT DATA | D21b |
|---|---|
| PARAMETER 1 | 0xC007(DATA FOR NOTIFICATION EVENT TAGS 1 TO 3 IN EVENT GROUP 1) |
| PARAMETER 2 | 0xC016(DATA FOR NOTIFICATION EVENT TAGS 2 AND 3 IN EVENT GROUP 2) |
| PARAMETER 3 | 0x0000(UNUSED) |

Fig. 14

| EVENT CODE | 0xC017 |
|---|---|
| PARAMETER 1 | 0x000000E8 (NUMBER OF PICTURES CAN BE SHOT: 1000 SHOTS) |
| PARAMETER 2 | 0x000003E8 (AVAILABLE VIDEO RECORDING TIME: 1000 SEC.) |
| PARAMETER 3 | 0x0000000A (ELAPSED VIDEO RECORDING TIME: 10 SEC.) |

Fig. 15C

| SETTING DATA (PROGRAM MODE) | | | D31 |
|---|---|---|---|
| ITEM | | | VALUE |
| NUMBER OF SET EVENT | | | 6 |
| EVENT GROUP 1 | EVENT GROUP CODE | | 0xC000 |
| | NOTIFICATION EVENT TAG 1 | TAG DEFINITION | 0x00000001 (ISO SENSITIVITY) |
| | | MAX DATA SIZE | 4 (BYTES) |
| | NOTIFICATION EVENT TAG 2 | TAG DEFINITION | 0x00000002 (SHUTTER SPEED) |
| | | MAX DATA SIZE | 4 (BYTES) |
| | NOTIFICATION EVENT TAG 3 | TAG DEFINITION | 0x00000003 (APERTURE VALUE) |
| | | MAX DATA SIZE | 2 (BYTES) |
| EVENT GROUP 2 | EVENT GROUP CODE | | 0xC010 |
| | NOTIFICATION EVENT TAG 1 | TAG DEFINITION | 0x00000011 (NUMBER OF PICTURES CAN BE SHOT) |
| | | MAX DATA SIZE | 4 (BYTES) |
| | NOTIFICATION EVENT TAG 2 | TAG DEFINITION | 0x00000005 (STILL IMAGE SIZE) |
| | | MAX DATA SIZE | 4 (BYTES) |
| | NOTIFICATION EVENT TAG 3 | TAG DEFINITION | 0x00000006 (STILL IMAGE QUALITY) |
| | | MAX DATA SIZE | 4 (BYTES) |
| EVENT GROUP 3 | EVENT GROUP CODE | | 0x0000 (UNUSED) |

Fig. 15D

| SETTING DATA (APERTURE PRIORITY MODE) ||| D32 |
|---|---|---|---|
| ITEM ||| VALUE |
| NUMBER OF SET EVENT ||| 6 |
| EVENT GROUP 1 | EVENT GROUP CODE || 0xC000 |
| | NOTIFICATION EVENT TAG 1 | TAG DEFINITION | 0x00000001 (ISO SENSITIVITY) |
| | | MAX DATA SIZE | 4 (BYTES) |
| | NOTIFICATION EVENT TAG 2 | TAG DEFINITION | 0x00000002 (SHUTTER SPEED) |
| | | MAX DATA SIZE | 4 (BYTES) |
| | NOTIFICATION EVENT TAG 3 | TAG DEFINITION | 0x00000000 (UNUSED) |
| | | MAX DATA SIZE | 0 (BYTES) |
| EVENT GROUP 2 | EVENT GROUP CODE || 0xC010 |
| | NOTIFICATION EVENT TAG 1 | TAG DEFINITION | 0x00000011 (NUMBER OF PICTURES CAN BE SHOT) |
| | | MAX DATA SIZE | 4 (BYTES) |
| | NOTIFICATION EVENT TAG 2 | TAG DEFINITION | 0x00000005 (STILL IMAGE SIZE) |
| | | MAX DATA SIZE | 4 (BYTES) |
| | NOTIFICATION EVENT TAG 3 | TAG DEFINITION | 0x00000003 (APERTURE VALUE) |
| | | MAX DATA SIZE | 2 (BYTES) |
| EVENT GROUP 3 | EVENT GROUP CODE || 0x0000 (UNUSED) |

*Fig. 15E*

| SETTING DATA (SHUTTER PRIORITY MODE) ||| D33 |
|---|---|---|---|
| ITEM ||| VALUE |
| NUMBER OF SET EVENT ||| 6 |
| EVENT GROUP 1 | EVENT GROUP CODE || 0xC000 |
| | NOTIFICATION EVENT TAG 1 | TAG DEFINITION | 0x00000001 (ISO SENSITIVITY) |
| | | MAX DATA SIZE | 4 (BYTES) |
| | NOTIFICATION EVENT TAG 2 | TAG DEFINITION | 0x00000000 (UNUSED) |
| | | MAX DATA SIZE | 0 (BYTES) |
| | NOTIFICATION EVENT TAG 3 | TAG DEFINITION | 0x00000003 (APERTURE VALUE) |
| | | MAX DATA SIZE | 2 (BYTES) |
| EVENT GROUP 2 | EVENT GROUP CODE || 0xC010 |
| | NOTIFICATION EVENT TAG 1 | TAG DEFINITION | 0x00000011 (NUMBER OF PICTURES CAN BE SHOT) |
| | | MAX DATA SIZE | 4 (BYTES) |
| | NOTIFICATION EVENT TAG 2 | TAG DEFINITION | 0x00000005 (STILL IMAGE SIZE) |
| | | MAX DATA SIZE | 4 (BYTES) |
| | NOTIFICATION EVENT TAG 3 | TAG DEFINITION | 0x00000002 (SHUTTER SPEED) |
| | | MAX DATA SIZE | 4 (BYTES) |
| EVENT GROUP 3 | EVENT GROUP CODE || 0x0000 (UNUSED) |

Fig. 15F

| SETTING DATA (VIDEO SHOOTING MODE) D34 | | | |
|---|---|---|---|
| ITEM | | | VALUE |
| NUMBER OF SET EVENT | | | 6 |
| EVENT GROUP 1 | EVENT GROUP CODE | | 0xC000 |
| | NOTIFICATION EVENT TAG 1 | TAG DEFINITION | 0x00000012 (AVAILABLE VIDEO RECORDING TIME) |
| | | MAX DATA SIZE | 4 (BYTES) |
| | NOTIFICATION EVENT TAG 2 | TAG DEFINITION | 0x00000013 (ELAPSED VIDEO RECORDING TIME) |
| | | MAX DATA SIZE | 4 (BYTES) |
| | NOTIFICATION EVENT TAG 3 | TAG DEFINITION | 0x00000000 (UNUSED) |
| | | MAX DATA SIZE | 0 (BYTES) |
| EVENT GROUP 2 | EVENT GROUP CODE | | 0xC010 |
| | NOTIFICATION EVENT TAG 1 | TAG DEFINITION | 0x00000014 (MOVING IMAGE QUALITY) |
| | | MAX DATA SIZE | 4 (BYTES) |
| | NOTIFICATION EVENT TAG 2 | TAG DEFINITION | 0x00000000 (UNUSED) |
| | | MAX DATA SIZE | 0 (BYTES) |
| | NOTIFICATION EVENT TAG 3 | TAG DEFINITION | 0x00000000 (UNUSED) |
| | | MAX DATA SIZE | 0 (BYTES) |
| EVENT GROUP 3 | EVENT GROUP CODE | | 0x0000 (UNUSED) |

Fig. 19

| THINNING SETTING DATA | D50 |
|---|---|
| ITEM | VALUE |
| THINNING TARGET EVENT | 0x******** |
| THINNING TYPE | 0x*1 OR 0x*2 |
| UPDATE INTERVAL | 0x**** |
| SET NUMBER OF TIMES | 0x**** |

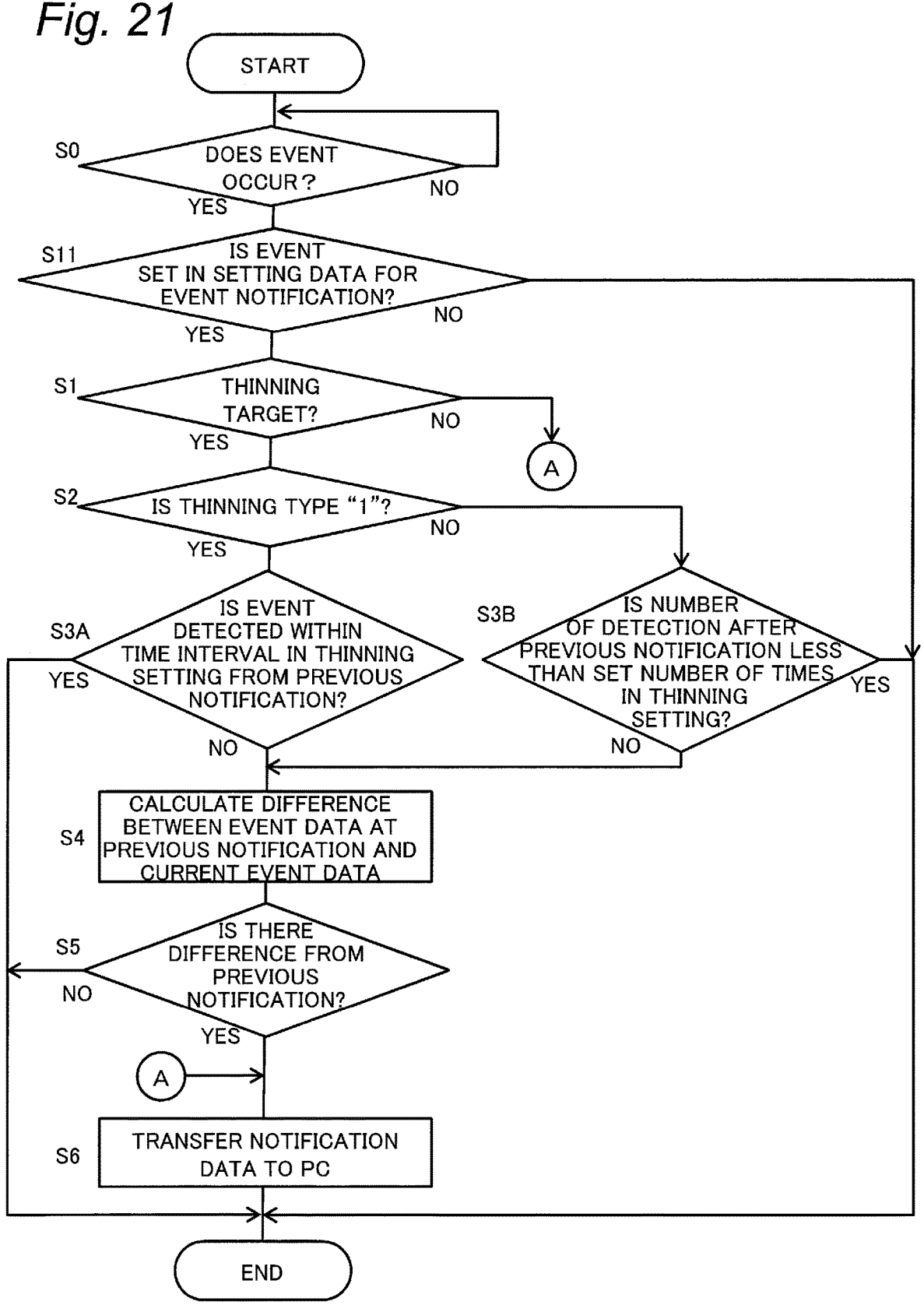

IMAGING APPARATUS AND CONTROL DEVICE FOR NOTIFYING A CHANGE IN A STATE OF THE IMAGING APPARATUS TO THE CONTROL DEVICE

BACKGROUND

1. Technical Field

The present disclosure relates to an imaging apparatus and a control device capable of performing data communication with each other.

2. Related Art

JP 2017-50639 A discloses a control device (for example, a mobile terminal) that transmits a command to a communication device such as a digital camera to control the communication device. The control device of JP 2017-50639 A receives a notification related to control restriction from the communication device, and determines whether a predetermined command can be transmitted to the communication device based on the received notification. Therefore, even in a case where a processing load is high due to moving image recording or the like in a communication device such as a digital camera, it is aimed to suppress that control by the control device is restricted more than necessary, and to improve convenience of the communication device and the control device.

SUMMARY

The present disclosure provides an imaging apparatus and a control device which can reduce a processing load in data communication for notifying a change in a state of the imaging apparatus to the control device.

An imaging apparatus according to an aspect of the present disclosure is configured to notify an external control device of information in the imaging apparatus. The imaging apparatus includes a communication circuitry and a control circuitry. The communication circuitry is configured to perform data communication with the control device. The control circuitry is configured to generate notification data in response to an event and control the communication circuitry to transmit notification data to the control device. The event indicates that a state in the imaging apparatus changes. The notification data includes a data storage region capable of storing data indicating each state in a plurality of types of events.

A control device according to an aspect of the present disclosure is configured to be notified of information from an external imaging apparatus. The control device includes a communication circuitry and a control circuitry. The communication circuitry is configured to perform data communication with the imaging apparatus. The control circuitry is configured to control an operation to receive notification data from the imaging apparatus via the communication circuitry in response to an event indicating that a state in the imaging apparatus changes. The notification data includes a data storage region capable of storing data indicating each state in a plurality of types of events. The control circuitry is configured to set setting data defining a type of event for which data can be stored in the data storage region in the notification data, and transmit the set setting data to the imaging apparatus via the communication circuitry.

An imaging apparatus according to another aspect of the present disclosure is configured to notify an external control device of information in the imaging apparatus. The imaging apparatus includes a communication circuitry and a control circuitry. The communication circuitry is configured to perform data communication with the control device. The control circuitry is configured to generate notification data in response to an event and control the communication circuitry to transmit the notification data to the control device. The event indicates that a state of the imaging apparatus changes. The control circuitry is configured to, when the event is caused in the imaging apparatus, include data of the caused event in the notification data, the data indicating a state that changes in the caused event, and control the communication circuitry to transmit the notification data to the control device.

According to the imaging apparatus and the control device of the present disclosure, it is possible to reduce a processing load in data communication for notifying the control device of a change in the state of the imaging apparatus.

BRIEF DESCRIPTION OF THE DRAWINGS

FIG. 7 is a diagram illustrating setting data for the event notification in the imaging system;

FIG. 9 is a diagram illustrating setting data for the event notification changed from the example of FIG. 7;

FIG. 10 is a sequence diagram illustrating an event notification operation in the imaging system;

FIGS. 11A, 11B and 11C are diagrams illustrating notification data for the event notification in the imaging system;

FIGS. 13A and 13B are diagrams illustrating commands for acquiring event data in the imaging system;

FIG. 14 is a diagram illustrating data acquired as a response to the command of FIG. 13;

FIG. 15C is a diagram illustrating setting data for the event notification in a program mode in the imaging system of the further modification.

FIG. 15D is a diagram illustrating setting data for the event notification in an aperture priority mode in the imaging system of the further modification.

FIG. 15E is a diagram illustrating setting data for the event notification in a shutter priority mode in the imaging system of the further modification.

FIG. 15F is a diagram illustrating setting data for the event notification in a video shooting mode in the imaging system of the further modification.

FIG. 19 is a diagram illustrating thinning setting data for an event notification;

FIG. 21 is a flowchart illustrating an event notification operation in a digital camera of a third embodiment.

DETAILED DESCRIPTION

Hereinafter, embodiments will be described in detail with reference to the drawings as appropriate. However, detailed descriptions more than necessary will be omitted in some cases. For example, detailed descriptions of already well-known matters and duplicate descriptions for substantially the same configuration will be omitted in some cases. A reason thereof is to avoid unnecessary redundancy of the following description and to facilitate the understanding of those skilled in the art. Note that the inventor(s) provides the accompanying drawings and the following description in order for those skilled in the art to fully understand the present disclosure, and does not intend to limit the subject described in the claims by these.

First Embodiment

In a first embodiment, an imaging system including an imaging apparatus and a control device of the present disclosure will be described.

1-1. Configuration

Figure 1:
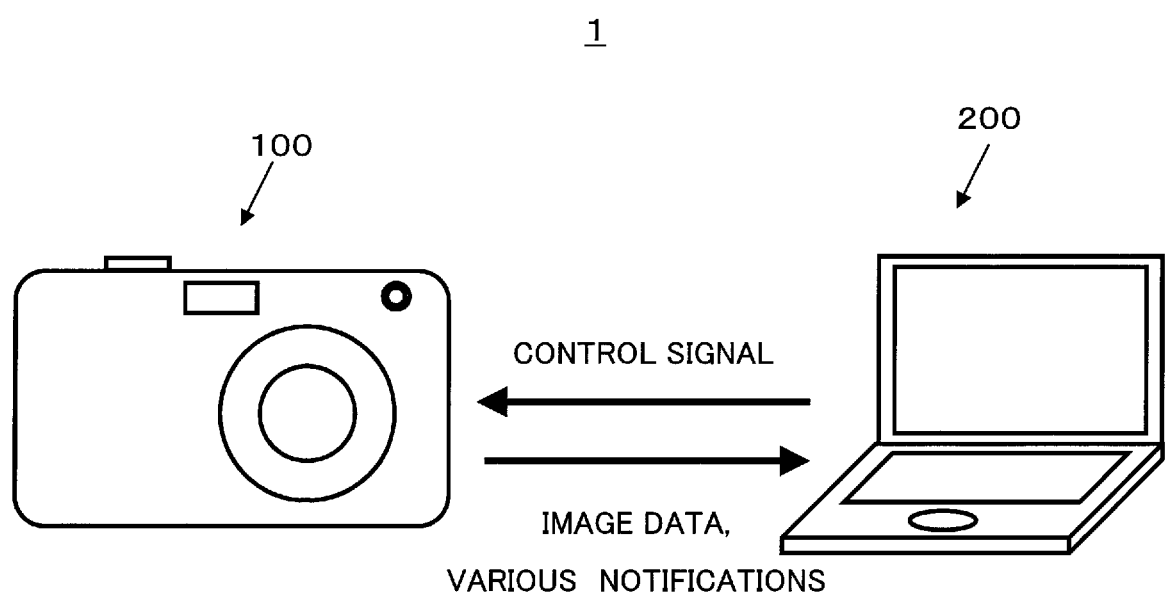
FIG. 1 is a diagram for explaining a configuration of an imaging system in a first embodiment of the present disclosure.

FIG. 1 is a diagram for explaining a configuration of an imaging system 1 according to a first embodiment of the present disclosure. The imaging system 1 in FIG. 1 includes a digital camera 100 as an example of an imaging apparatus and a personal computer (PC) 200 as an example of a control device.

The imaging system 1 is configured to enable data communication between the digital camera 100 and the PC 200 in a protocol for image transfer such as a picture transfer protocol (hereinafter abbreviated as "PTP"). For example, through data communication between the digital camera 100 and the PC 200, the digital camera 100 can transfer an image being captured to the PC 200 in real time and perform live view display on the PC 200. The live view (hereinafter abbreviated as "LV") is a function displaying, as a real-time moving image or the like, an image captured by the digital camera 100.

In the present system 1, for example, notifications regarding various states (hereinafter referred to as a "camera state") in the digital camera 100 are transmitted from the digital camera 100 to the PC 200. The PC 200 is configured to perform various controls on the camera state to be notified. For example, the PC 200 issues a control signal related to data communication with the digital camera 100. A control signal for remote control may be transmitted from the PC 200 to the digital camera 100. In this case, the digital camera 100 can be remotely operated from the PC 200.

The configurations of the digital camera 100 and the PC 200 will be described below with reference to FIGS. 2 and 3.

1-1-1. Configuration of Digital Camera

Figure 2:
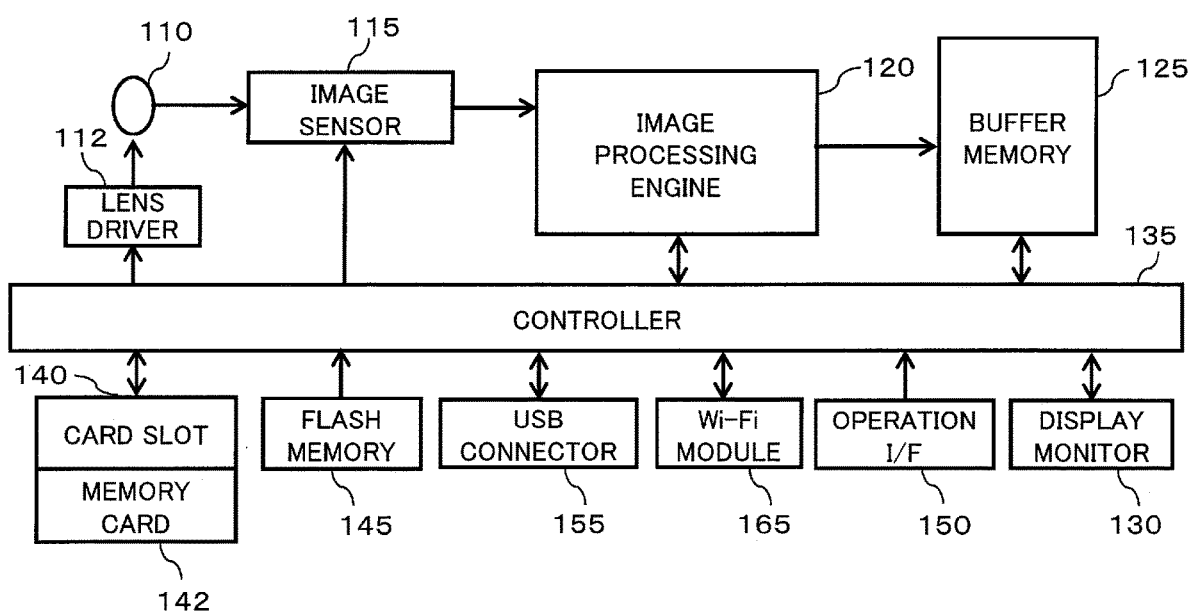
FIG. 2 is a block diagram illustrating a configuration of a digital camera in the imaging system.

FIG. 2 is a diagram illustrating a configuration of the digital camera 100 according to the present embodiment. The digital camera 100 of the present embodiment includes an image sensor 115, an image processing engine 120, a display monitor 130, and a controller 135. Further, the digital camera 100 includes a buffer memory 125, a card slot 140, a flash memory 145, an operation interface 150, a USB connector 155, and a Wi-Fi module 165. Hereinafter, the "interface" is abbreviated as "I/F". In addition, the digital camera 100 includes, for example, an optical system 110 and a lens driver 112.

The optical system 110 includes a focus lens, a zoom lens, an optical image stabilization lens (OIS), an aperture, a shutter, and the like. The focus lens is a lens configured to change a focus state of a subject image formed on the image sensor 115. The zoom lens is a lens configured to change the magnification of the subject image formed by the optical system. Each of the focus lens and the like is configured using one or a plurality of lenses.

The lens driver 112 drives the focus lens and the like in the optical system 110. The lens driver 112 includes a motor and moves the focus lens along an optical axis of the optical system 110 under the control by the controller 135. A configuration for driving the focus lens in the lens driver 112 can be implemented with a DC motor, a stepping motor, a servo motor, an ultrasonic motor, or the like. The lens driver 112 includes an aperture actuator that drives the aperture in the optical system 110 under the control by the controller 135.

The image sensor 115 captures the subject image formed via the optical system 110 to generate imaging data. The imaging data is image data indicating an image captured by the image sensor 115. The image sensor 115 generates image data of a new frame at a predetermined frame rate (e.g., 30 frames/second). The generation timing of imaging data and an electronic shutter operation of the image sensor 115 are controlled by the controller 135. As the image sensor 115, various image sensors, such as a CMOS image sensor, a CCD image sensor, and an NMOS image sensor, can be used.

The image sensor 115 performs an imaging operation or the like of a moving image, a still image, or an LV image used for LV display. The LV image is mainly a moving image, and is displayed on the display monitor 130 for a user to determine a composition for capturing a still image, for example. The image sensor 115 performs various operations such as exposure and electronic shutter.

The image processing engine 120 performs various types of processing on imaging data output from the image sensor 115 to generate image data or performs various types of processing on image data to generate an image to be displayed on the display monitor 130. Examples of the various types of processing include white balance correction, gamma correction, YC conversion processing, electronic zoom processing, compression processing, decompression processing, and the like, but are not limited thereto.

The image processing engine 120 may be configured using a hard-wired electronic circuit, or may be configured using a microcomputer, a processor, or the like using a program.

The display monitor 130 is an example of a display that displays various types of information. For example, the display monitor 130 displays an image (LV image or the like) indicated by image data captured by the image sensor 115 and subjected to image processing by the image processing engine 120. In addition, the display monitor 130 displays a menu screen or the like for a user to make various settings in the digital camera 100. The display monitor 130 can be configured using a liquid crystal display device or an organic EL device, for example.

The operation I/F 150 is a general term for hard keys and soft keys, such as an operation button and an operation dial provided on the exterior of the digital camera 100, and receives a user operation. For example, the operation I/F 150 includes a release button, a mode dial, a touch panel of the display monitor 130, a joystick, and the like. When receiving the user operation, the operation I/F 150 transmits an operation signal corresponding to the user operation to the controller 135.

The controller 135 is a hardware controller and comprehensively controls the operation of the entire digital camera 100. The controller 135 includes a CPU and the like, and the CPU realizes a predetermined function by executing a program (software). The controller 135 may, in place of the CPU, include a processor configured using a dedicated electronic circuit designed to realize a predetermined function. That is, the controller 135 can be implemented with various processors such as a CPU, an MPU, a GPU, a DSU, an FPGA, and an ASIC. The controller 135 may configured using one or a plurality of processors. In addition, the controller 135 may be configured using one semiconductor chip together with the image processing engine 120 and the like.

The controller 135 controls data communication between the digital camera 100 and the PC 200 via the USB connector 155, for example. For example, the controller 135 performs control for transmitting the LV image and various notifications to the PC 200 via the USB connector 155. Furthermore, the controller 135 performs auto-focus control (AF control), auto-exposure control (AE control) and the like, for example. The controller 135 adjust the exposure in the exposure control by changing an aperture value, a shutter speed, and an ISO sensitivity, for example. The controller 135 is an example of a control circuitry in the imaging apparatus of the present embodiment.

The buffer memory 125 is a recording medium that functions as a work memory for the image processing engine 120 and the controller 135. The buffer memory 125 is implemented with a dynamic random access memory (DRAM) or the like. The flash memory 145 is a non-volatile recording medium. For example, the buffer memory 125 stores setting data D1 for an event notification, various setting information in the digital camera 100, and the like. The setting data D1 is described later. Each of the memories 125 and 145 is an example of a storage in the present embodiment.

Although not illustrated, the controller 135 may have various internal memories includes a built-in ROM, for example. Various programs executed by the controller 135 are stored in the ROM. The controller 135 may include a RAM that functions as a work area of the CPU. The various memories are also examples of the storage in the present embodiment.

The card slot 140 is an interface for inserting a removable memory card 142. The card slot 140 enables electrical and mechanical connection with the memory card 142. The memory card 142 is an external memory having recording element such as a flash memory inside. The memory card 142 can store data such as image data generated by the image processing engine 120.

The USB connector 155 is a circuit for connecting an external device such as the PC 200 to the digital camera 100 in compliance with the USB standard. The USB connector 155 receives various types of information from the external device or transmits various types of information to the external device by communication conforming to the USB standard under the control by the controller 135. The USB connector 155 is an example of a communication circuitry in the imaging apparatus of the present embodiment.

The Wi-Fi module 165 is a circuit that performs communication conforming to the Wi-Fi standard. The digital camera 100 can communicate with another device via the Wi-Fi module 165. The digital camera 100 may communicate directly with another device via the Wi-Fi module 165 or may communicate with another device via an access point. The Wi-Fi module 165 may be connectable to a communication network such as the Internet.

1-1-2. Configuration of PC

Figure 3:
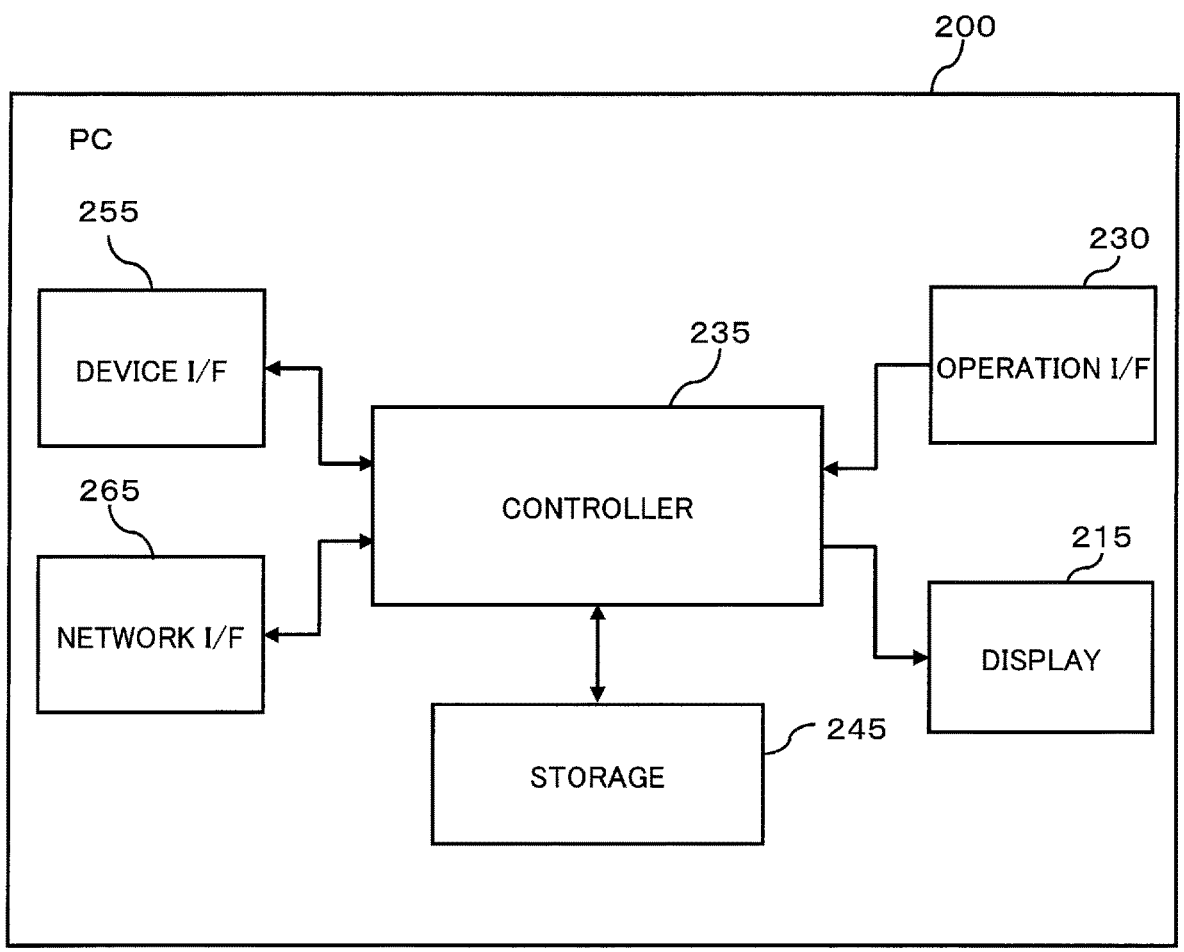
FIG. 3 is a block diagram illustrating a configuration of a PC in the imaging system.

FIG. 3 is a block diagram illustrating a configuration of the PC 200 according to the present embodiment. The PC 200 in FIG. 3 includes a display 215, an operation I/F 230, a controller 235, a storage 245, a device I/F 255, and a network I/F 265.

The display 215 includes a liquid crystal display or an organic EL display, for example. The display 215 displays the LV image, various notifications, and the like received from the digital camera 100. The display 215 may display various icons for operating the operation I/F 230, information input from the operation I/F 230, and the like.

The operation I/F 230 is a general term for operation consoles operated by a user. For example, the operation I/F 230 includes a keyboard, a mouse, a touch pad, a button, and/or a switch. The operation I/F 230 may constitute a touch panel together with the display 215. When receiving an operation by the user, the operation I/F 230 transmits an operation signal corresponding to the user operation to the controller 235.

The controller 235 is electrically connected to each hardware constituting the PC 200 and controls the operation of each hardware. The controller 235 includes a CPU and the like, and the CPU realizes a predetermined function by executing a program (software). The controller 235 may be implemented only with a hardware circuit exclusively designed to realize a predetermined function. In addition to the CPU, the controller 235 can include various circuits such as an MPU, a GPU, a DSP, an FPGA, and an ASIC. The controller 235 may include an internal memory as a temporary storage area for holding various data and programs. The controller 235 is an example of a control circuitry in the control device of the present embodiment.

The storage 245 is a recording medium that stores data, programs, and the like necessary for realizing a predetermined function in the PC 200. For example, the storage 245 includes a hard disk (HDD), a semiconductor storage device (SSD), a semiconductor memory (RAM), or the like. The storage 245 may function as a work area of the controller 235 or may be constituted by a storage area in an internal memory of the controller 235.

The device I/F 255 is a circuit for connecting an external device such as the digital camera 100 to the PC 200. The device I/F 255 performs communication conforming to the USB standard, the Bluetooth standard, or the like. The device I/F 255 in the present embodiment receives various types of information from an external device or transmits various types of information to the external device under the control by the controller 235 by communication conforming to the USB standard, for example. The device I/F 255 is an example of a communication circuitry in the control device of the present embodiment.

The network I/F 265 is a circuit that performs communication conforming to the communication standard IEEE 802.11, the Wi-Fi standard, or the like. The PC 200 can communicate with another device directly or via an access point via the network I/F 265. The network I/F 265 may be connectable to a communication network.

1-2. Operation

Operations of the digital camera 100 and the PC 200 configured as described above will be described below.

In the imaging system 1 (FIG. 1) of the present embodiment, the digital camera 100 and the PC 200 perform data communication conforming to the USB standard, for example. For example, the digital camera 100 periodically transfers the LV image to the PC 200, and transmits an event notification for notifying occurrence of an event indicating a change in the camera state. The PC 200 can display the real-time camera state in the digital camera 100 while displaying the LV image on the display 215 in accordance with the event notification from the digital camera 100, for example.

1-2-1. Problem Regarding Event Notification

Figure 4:
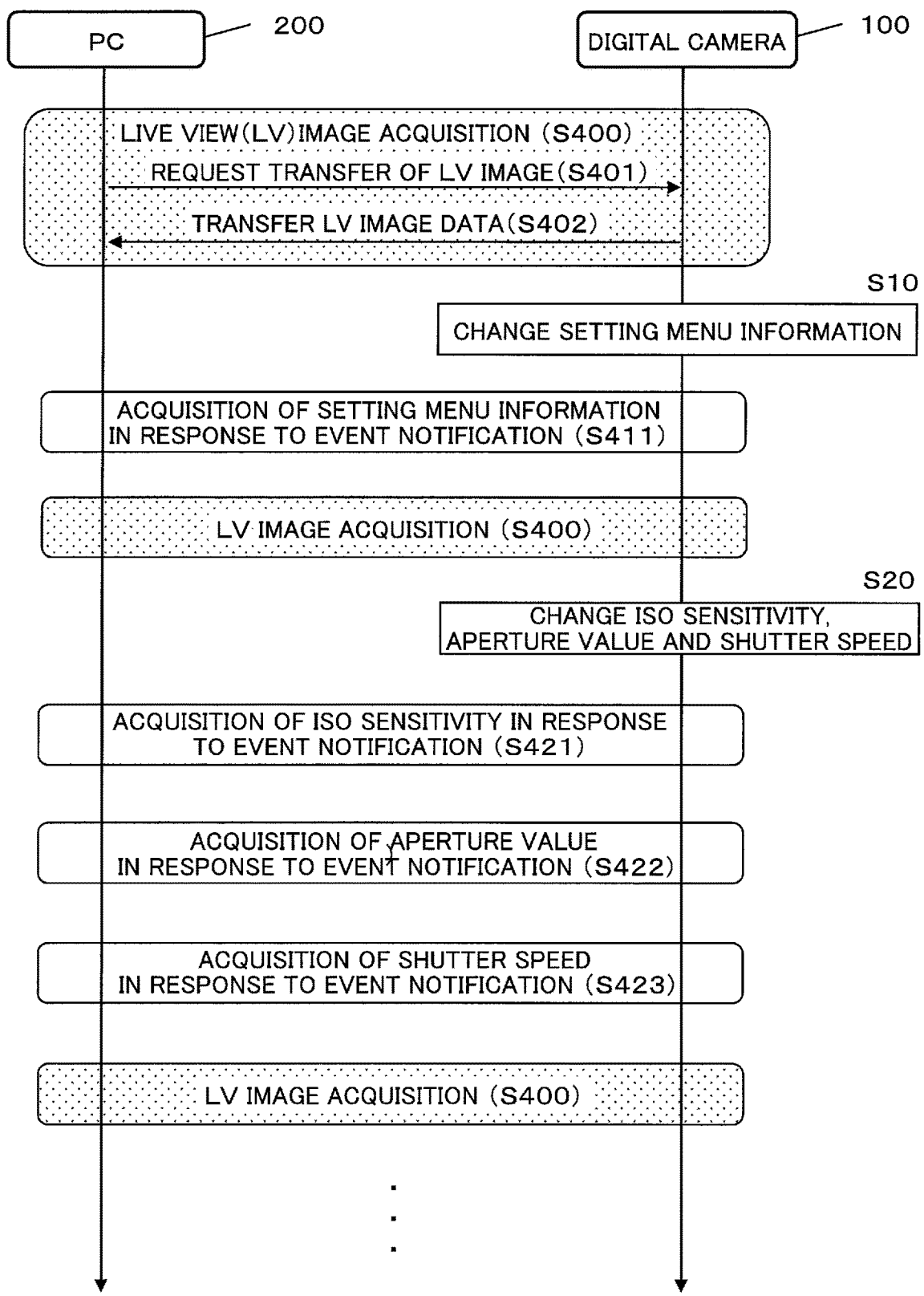
FIG. 4 is a sequence diagram for explaining a problem regarding an event notification in the imaging system.

A problem at the time of data communication related to the above-described event notification will be described with reference to FIG. 4. FIG. 4 is a sequence diagram for explaining a problem regarding event notification in the imaging system 1. The sequence of FIG. 4 illustrates an operation example of the LV display in a case where an event notification to be described later is not particularly set in the imaging system 1.

In the operation example of FIG. 4, processing in which the PC 200 acquires the LV image from the digital camera 100 for the LV display is performed (S400) in a frame cycle, for example. For example, in step S400 of acquiring the LV image for one frame, the controller 235 of the PC 200 requests the digital camera 100 to transfer the LV image (S401), and the controller 135 of the digital camera 100 transmits the image data of the LV image to the PC 200 as a response to the transfer request (S402).

In the example of FIG. 4, in the digital camera 100, various events such as change of setting menu information indicating setting information in the setting menu (S10) and change of the ISO sensitivity, the aperture value, and the shutter speed (S20) occur. In the example of FIG. 4, the digital camera 100 performs the event notification in response to the occurrence of each event in steps S10 and S20 (S411 to S423).

The digital camera 100 performs each event notification by interrupting the LV image acquisition processing for each frame (S400), for example, (S411 to S423). When interrupt processing due to each event notification frequently occurs the frame delay of the LV display due to the execution delay of step S400 and various processing loads in the data communication between the digital camera 100 and the PC 200 may occur, for example.

Furthermore, in a case where the digital camera 100 receives the transfer request (S401) from the PC 200 and then performs the data transmission (S402) in one event notification as in step S400, it is concerned that processing load for each event becomes excessive. Furthermore, in the example of FIG. 4, a plurality of events occur simultaneously in step S20. In this case, when the event notification is performed a plurality of times for each event (S421 to S423), it is concerned that the processing load further increases.

Therefore, the present embodiment provides an event notification communication method which can reduce the processing load due to the event notification as described above in data communication between the digital camera 100 and the PC 200.

1-2-2. Outline of Operation

An outline of an operation performing event notification (also referred to as an "event notification operation" herein) during LV display in the imaging system 1 of the present embodiment will be described with reference to FIG. 5.

Figure 5:
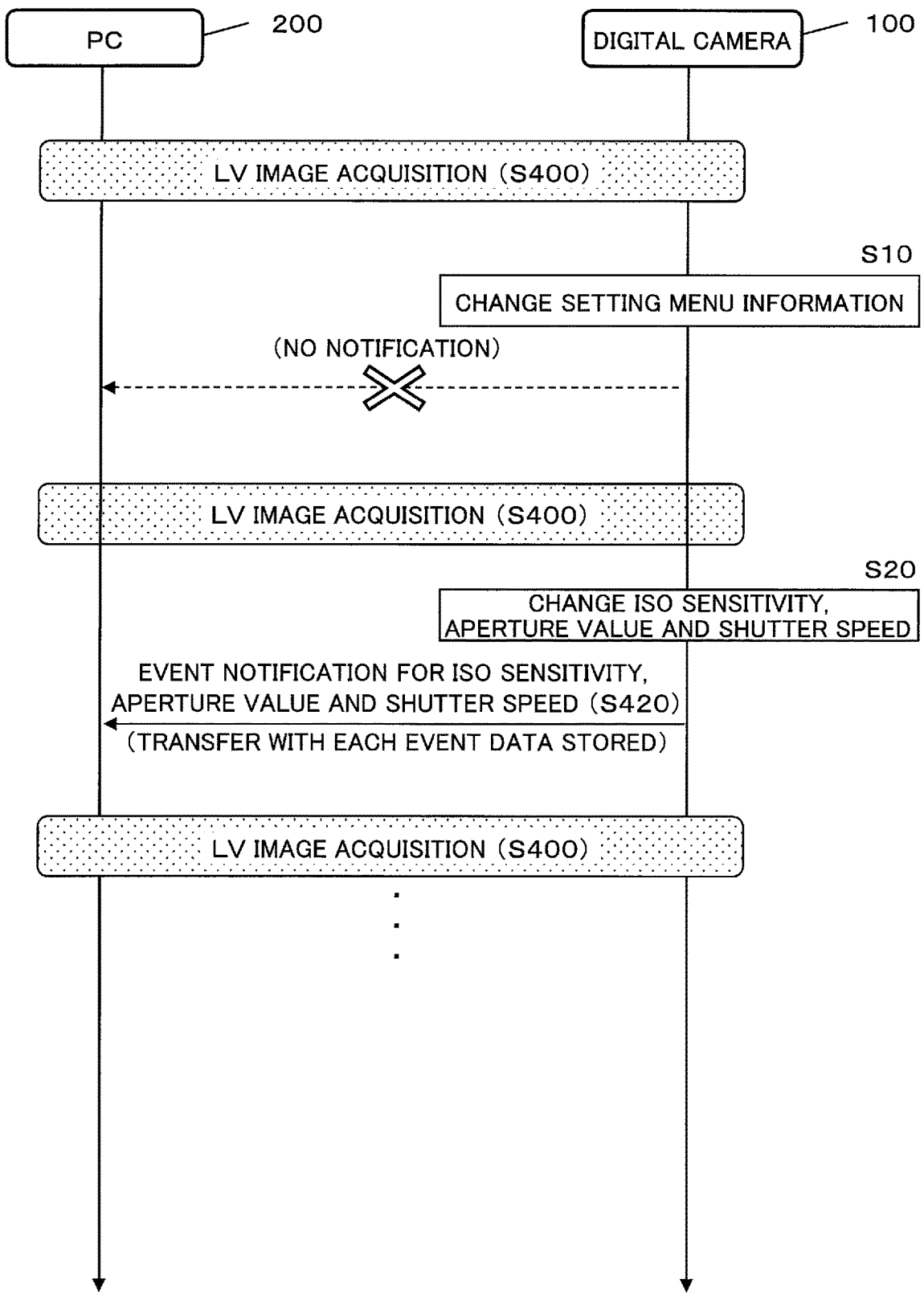
FIG. 5 is a sequence diagram for explaining an event notification operation during live view display in the imaging system.

FIG. 5 is a sequence diagram for describing an event notification operation during LV display in the imaging system 1 of the present embodiment. FIG. 5 illustrates an operation example similar to FIG. 4 in a case where an event notification is set (as described later) in the present system 1.

In the present system 1, an event to be notified from the digital camera 100 to the PC 200 can be selectively set. In the example of FIG. 5, in the digital camera 100, an event of changing the setting menu information is set not to be notified. In this case, unlike the example of FIG. 4, even when the event of changing the setting menu information occurs (S10), the digital camera 100 does not transmit the event notification, and the PC 200 does not acquire corresponding event data. According to such selective event notification, frequent occurrence of the interrupt processing can be avoided, a delay in LV display can be suppressed, and a communication load between the digital camera 100 and the PC 200 can also be reduced, for example.

In addition, in the present system 1, events of a plurality of types can be set to be notified collectively by one event notification. In the example of FIG. 5, the digital camera 100 is set to notify each event of changing the ISO sensitivity, the aperture value, and the shutter speed at a time as the change in the camera state regarding the AE control. In this case, when an event of changing the ISO sensitivity, the aperture value, and the shutter speed occurs at the same time (S20), the digital camera 100 transmits only one event notification corresponding to the plurality of events (S420). Therefore, a processing load on communication between the digital camera 100 and the PC 200 due to occurrence of events of a plurality of types is reduced.

Furthermore, in step S420, the imaging system 1 of the present embodiment stores the event data for each event in the event notification itself to transmit the event data by the data structure of notification data, which is described later. Thus, the PC 200 can acquire the event data without performing the request for data transfer from the PC 200 and the data transmission responding from the digital camera 100, which are similar to the processing (S401, S402) for the LV image acquisition (S400), for example. Therefore, the processing load and the like due to the communication between the digital camera 100 and the PC 200 can be further reduced. Details of the operation of the present system 1 will be described below.

1-2-3. Setting for Event Notification

In the imaging system 1 of the present embodiment, an event notification is set in advance before performing the event notification as described above, for example. An operation for performing a setting for event notification in the imaging system 1 will be described with reference to FIGS. 6 and 7.

Figure 6:
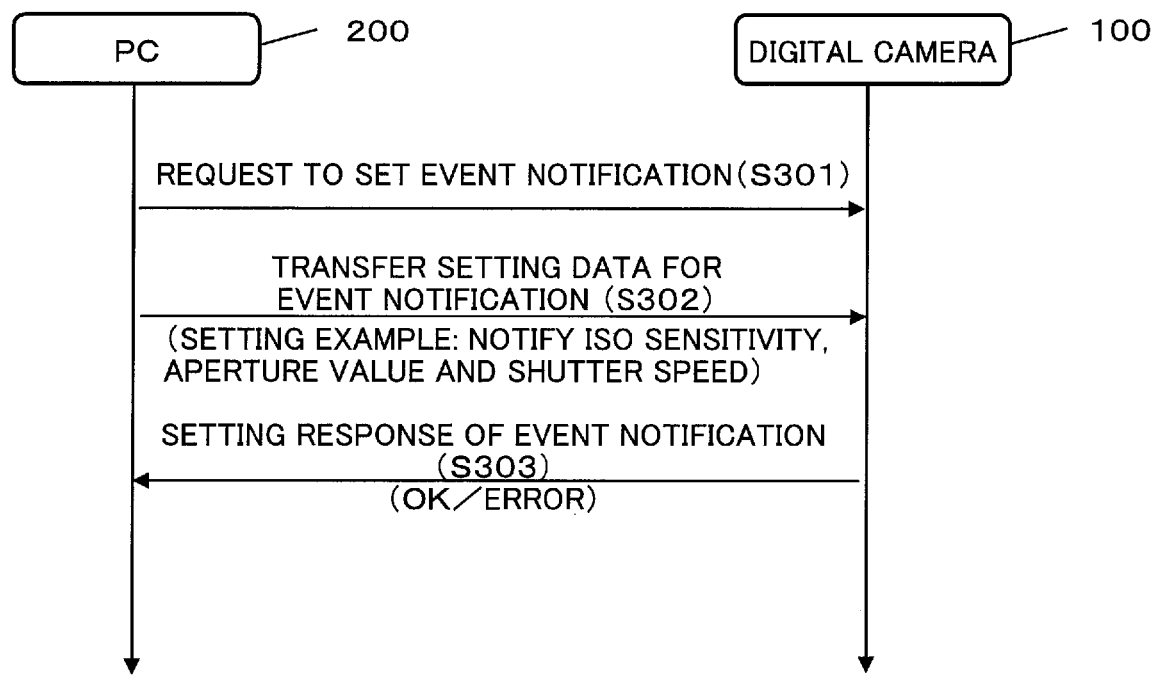
FIG. 6 is a sequence diagram illustrating an operation to set the event notification in the imaging system of the first embodiment.

FIG. 6 is a sequence diagram illustrating an operation to set event notification in the imaging system 1 of the present embodiment. FIG. 7 is a diagram illustrating the setting data D1 for the event notification in the imaging system 1.

In the operation of FIG. 6, the PC 200 first transmits a request to set event notification to the digital camera 100 (S301). For example, when a user operation to start setting for the event notification is input on the operation I/F 230, the PC 200 requests the digital camera 100 to set the event notification (S301).

Next, the PC 200 transmits, to the digital camera 100, the setting data D1 (see FIG. 7) that defines the type of event to be included in the event notification (S302). For example, before the operation example of FIG. 5, the transmitted setting data D1 that defines the event notification to collectively notify the respective events of changing each of the ISO sensitivity, the aperture value, and the shutter speed. The setting data D1 for the event notification is generated by displaying a setting menu or the like on the display 215 of the PC 200 to receive an operation by the user inputting information on the operation I/F 230 with the setting menu, for example.

When receiving the setting data D1, the digital camera 100 stores the setting data D1 in the buffer memory 125, and returns a setting response of an event notification to the PC 200 (S303), for example. For example, the setting response is "OK" when the controller 135 successfully receives and stores the setting data D1 readable in the digital camera 100. On the other hand, the setting response is "Error" when failing to receive or store the setting data D1.

According to the operation to set the event notification as described above, in the imaging system 1, the setting data D1 for the event notification can be set in the digital camera 100 from the PC 200 (S302).

The sequence illustrated in FIG. 6 may be started when a processing load of the controller 235 increases to a predetermined threshold or more, monitoring the processing load of the controller 235 in the PC 200, for example. In this case, the sequence of FIG. 6 may be performed using the setting data D1 stored in advance in the storage 245 of the PC 200, for example.

1-2-3-1. Setting Data for Event Notification

Details of the setting data D1 for the event notification will be described with reference to FIG. 7.

The setting data D1 for the event notification illustrated in FIG. 7 includes "Item" indicating a setting item and "Value" indicating a setting value of each item. The setting data D1 in the example of FIG. 7 includes three event groups namely event groups 1 to 3. The event group defines events of one or more types to be collectively notified by one event notification in events of a plurality of types.

The present system 1 uses a Still Image Capture Device class using PTP in the USE standard for transfer of various data, for example. In this example, up to three events can be set in each event group according to the definition of the class. The setting data D1 of FIG. 7 includes notification event tags 1 to 3 each associated with respective events in the maximum number in each of two event groups 1 and 2.

The items of the setting data D1 include "Event Setting Number" indicating the number of types of events to be notified, "Event Group Code" indicating each event group, "Tag Definition" for each of the notification event tags 1 to 3, and "Maximum Data Size". The tag definition is an item indicating the type of an event to be notified. The tag definition is set in accordance with a predetermined specified code, for example. The maximum data size indicates the maximum data size that can be stored when event data is included and transmitted in an event notification, the event data being stored in response to the event of the tag definition.

In the setting data D1 of FIG. 7, the value of the event setting number is set to "6". In the example of FIG. 7, events of the ISO sensitivity, the shutter speed, and the aperture value are set to be notified by each of the notification event tags 1 to 3 of the event group 1. In addition, the event group 2 is set to notify three events related to recording an image. The event group codes of the event groups 1 and 2 are set to "0x0000" and "0xC010" in hex number, respectively, and the event group code of the event group 3 is set to "0x0000" indicating unused.

According to the setting data D1 for the event notification having the above described data structure, the imaging system 1 of the present embodiment can collectively notify a plurality of events in each event group and notify different events for each event group. In addition, an event not set in any event group is not notified, and only an event set in each event group can be selectively notified. Further, event data can be stored in an event notification up to a maximum data size for each event.

The event group number that can be set in the setting data D1 is not limited to three, and may be one, two, or four or more. For example, four or more event groups can be provided as long as the number of event groups is within a range that can be expressed by bits other than reserved bits for the PTP in the event group code. The digital camera 100 and the PC 200 may recognize that the event group 3 is unused based on the event setting number of the setting data D1. In this case, the setting data D1 may not include the event group code of the event group 3. Furthermore, the number of events set by the notification event tag in each event group is not limited to three, and may be, for example, two.

Furthermore, the setting data D1 for the event notification is not limited to the example of FIG. 7, and may be set including an event indicating a change in the camera state due to a change in setting information regarding AF control, a change in various capturing settings, or the like in the digital camera 100, for example. In addition, when all the event notifications are disabled, the event setting number in the setting data may be set to a zero value, and the event group code of each group may be set to an unused value, for example. On the other hand, in a case where the setting for the event notification is canceled and the notification is performed for each event among all events occurring as illustrated in FIG. 4 the event setting number in the setting data may be set to "0xFFFF", for example. In this case, the event group code of each group may be set to an unused value.

1-2-3-2. Change of Event Notification Setting

The imaging system 1 of the present embodiment may have a function to change the setting for the event notification, after setting the event notification as described above, by the user checking the set content, for example. An operation to change the setting in the imaging system 1 will be described with reference to FIGS. 8 and 9.

Figure 8:
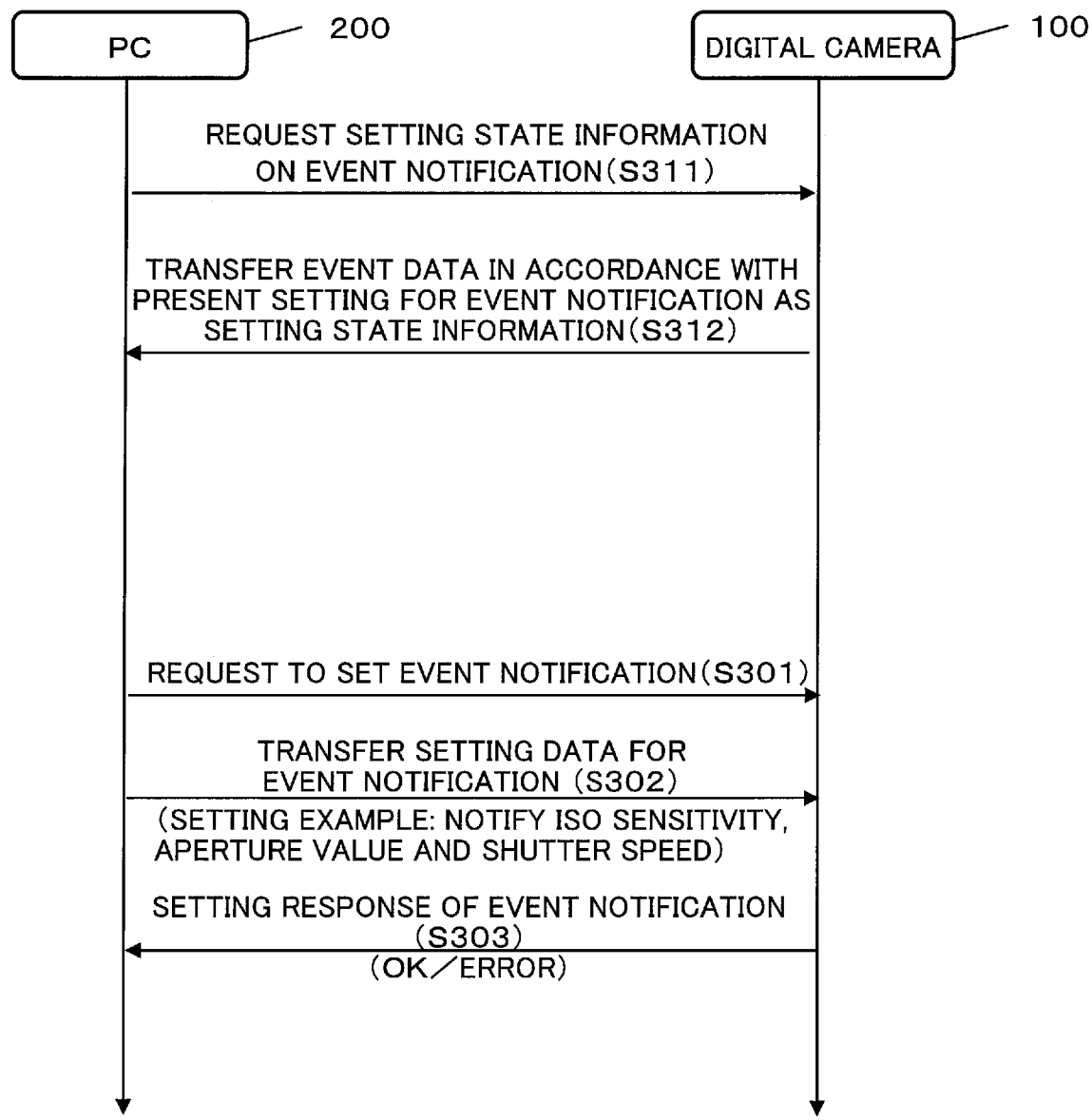
FIG. 8 is a sequence diagram illustrating an operation to change the setting of the event notification in the imaging system.

FIG. 8 is a sequence diagram illustrating an operation to change the setting for the event notification in the imaging system 1. FIG. 9 illustrates setting data D11 changed from the example of FIG. 7.

The controller 235 of the PC 200 first transmits, to the digital camera 100, a request for acquiring setting state information on the event notification (step S311). The setting state information indicates a setting state of the event notification in the digital camera 100.

When receiving the acquisition request from the PC 200, the controller 135 of the digital camera 100 transmits, to the PC 200, the setting data D1 stored in the buffer memory 125 at the time of receiving the acquisition request, as setting state information (S312), for example.

For example, the PC 200 displays the received setting state information on the display 215. Thereafter, the PC 200 performs steps S301 to S303 similar to those in FIG. 6, by a user operation of starting the setting for the event notification, for example.

According to the above operation, the PC 200 can change the setting, referring to the current setting for the event notification by acquiring the setting state information from the digital camera 100 (S311, S312), for example. The above operation may be started when an operation mode is switched in the digital camera 100 from an operation mode for capturing an image to an operation mode for reproducing an image (alternatively, when the operation mode is conversely switched from the operation mode for image reproduction to the operation mode for image capturing), for example.

FIG. 9 illustrates the setting data D11 changed from the setting data D1 of FIG. 7 by the setting change operation of FIG. 8. For example, in the setting data D11, in the notification event tag 3 of the event group 1, the tag definition indicating the aperture value in the original setting data D1 is changed to the tag definition indicating unused, and the maximum data size is changed to "0" (byte).

In addition, the event stored in the notification event tag 1 in the event group 2 of the original setting data D1 (FIG. 7) is canceled in the example of FIG. 9. Accordingly, for the events of the notification event tags 2 and 3 in the event group 2 of the original setting data D1, storage destinations are moved up to the notification event tags 1 and 2 in the changed setting data D11.

Further, in the event group 3 that is unused in the original setting data D1 (FIG. 7), the event group code is changed to "0xC020" in the setting data D11 of FIG. 9. In the event group 3 of the setting data D11 of this example, the event of "Setting Menu Information" is set in the notification event tag 1, and the other notification event tags 2 and 3 are unused.

In the above example, accompanying the change of canceling the event in the original setting data D1 (FIG. 7), the remaining events are moved up in the setting data D11, but the remaining events may not be moved up in other example. In this case, in the notification event tag 1 of the canceled event, the tag definition may be changed to an unused value, and the maximum data size may be changed to a zero value, for example.

1-2-4. Details of Event Notification Operation

An operation in which the digital camera 100 notifies the PC 200 of the event after setting the event notification as described above will be described with reference to FIGS. 10 and 11.

FIG. 10 is a sequence diagram illustrating an event notification operation in, the imaging system 1 of the present embodiment. FIGS. 11A, 11B and 11C are diagrams each illustrating notification data of an event notification. The sequence illustrated in FIG. 10 is performed during an operation similar to the operation in FIG. 5, in a state where the setting data D1 for the event notification illustrated in FIG. 7 is set, for example. In FIG. 10, the processing for LV image acquisition (S400) is not illustrated.

In the digital camera 100 of this example, when the event of changing the ISO sensitivity occurs (S20A), the controller 135 generates notification data indicating the event notification with an event code "0xC001" and transmits the notification data to the PC 200 (S420A). The event code indicates the type of event to be notified, by associating with the event group code in the setting data D1. The notification data of the event notification includes event data indicating a camera state changed by the corresponding event to be notified. Notification data D20a of the event notification in step S420A is illustrated in FIG. 11A.

In step S420A, the controller 135 causes the USB connector 155 to transmit the notification data D20a in which the data of the changed ISO sensitivity is stored as the event data in the event notification. The controller 235 of the PC 200 receives the event notification from the device I/F 255 and acquires stored event data, for example.

The event code "0xC001" of the notification data D20a illustrated in FIG. 11A is a value obtained by changing, in the event group code of the event group 1 of the setting data D1, the first bit of lower 4 bits in binary number (i.e., the least significant bit) to "1". This event code "0xC001" indicates that the notification event tag 1 of the group 1 is valid, that is, "ISO Sensitivity" is to be notified. In this manner, the event code indicates, by using the lower bits of the event group code, the valid or invalid of notification of the event which is set in each notification event tag.

The notification data D20a further includes parameters 1 to 3 indicating data of events corresponding to the notification event tags 1 to 3, of which validity/invalidity is indicated by the event code. In the example of FIG. 11A, after the change of the ISO sensitivity corresponding to the valid notification event tag 1, the parameter 1 stores a data value indicating, in hex number, the value "100". In addition, zero values are stored in the parameters 2 and 3 in response to the notification event tags 2 and 3 being invalid, that is, in response to the shutter speed and the aperture value are notified.

When both the ISO sensitivity and the aperture value are changed within the predetermined period that can be regarded as being simultaneous in the digital camera 100 (S203), the controller 135 generates notification data of an event code "0xC005" and transmits the notification data to the PC 200 (S420B). The event code indicates validity of the notification event tags 1 and 3 by setting each of the lower first and third bits to "1" in the event group code of the event group 1.

In step S420B, the controller 135 generates the notification data of the event notification, in the data structure similar to the notification data D20a of FIG. 11A, to store the event data of the aperture value in the parameter 3 in addition to the ISO sensitivity of the parameter 1, for example.

Further, when the ISO sensitivity, the aperture value, and the shutter speed are changed in the digital camera 100 as in the example of FIG. 5 (S20), the controller 135 transmits notification data of an event code "0xC007" to the PC 200 (S420). The event code indicates validity of the notification event tags 1 to 3 by setting, in the event group code of the event group 1 of the setting data D1, each of the lower first to third bits to "1". FIG. 11B illustrates notification data D20 in step S420. The notification data D20 stores the event data of the ISO sensitivity, the shutter speed, and the aperture value in each of the parameters 1 to 3.

Further, in the digital camera 100, when an event occurs during capturing images, the event corresponding to a change in the number of pictures that can be shot (S30A), the controller 135 transmits notification data of an event code "0xC011" to the PC 200 (S430A), for example. The event code indicates validity of the notification event tag 1 by setting the lower 1 bit of the event group code of the event group 2 of the setting data D1 to "1". In the notification data in step S430A, event data is stored in the parameter 1 for the number of pictures that can be shot, and zero values are stored in the parameters 2 and 3 corresponding to the invalidity of the notification event tags 2 and 3.

When both the available video recording time and the elapsed video recording time are changed within the predetermined period that can be regarded as being simultaneous in the digital camera 100 (S303), the controller 135 transmits notification data of an event code "0xC016" to the PC 200 (S430B). The event code indicates validity of the notification event tags 2 and 3 by setting, in the event group code of the event group 2 of the setting data D1, each of the lower second and third bits to "1". FIG. 11C illustrates notification data D30b in step S430B. In the notification data D30b, a zero value is stored in the parameter 1, corresponding to the invalidity of the notification event tag 1, and event data of the available video recording time and event data of the elapsed video recording time are stored in the parameters 2 and 3, respectively.

According to the event notification operation described above, the notification data D20 to D30b indicating the event notification is generated and transmitted to the PC 200 (S420 to S430B) in response to the event in the digital camera 100 (S20A to S30B). Each of the pieces of notification data D20 to D30b has parameters 1 to 3 each capable of storing event data of each event among events of a plurality of types, and has an event code indicating a type of an event (or types of events) included in the event notification.

Therefore, in each of the pieces of notification data D20 to D30b, a plurality of events in the digital camera 100 can be collectively notified to the PC 200. In addition, only a specific event is selectively notified based on the setting data D1, and the PC 200 can recognize which event is notified by the event code in each of the pieces of notification data D20 to D30b. Furthermore, in the notification data D20 to D30b, the event data of each event can be stored in the parameters 1 to 3 and transmitted together with the event notification. The event notification operation and the data structure of the notification data D20 to D30b can reduce a processing load in communication for notifying the PC 200 of the event of the digital camera 100.

1-2-5. Acquisition of Event Data

In addition to the event notification operation as described above, the imaging system 1 of the present embodiment may have a function to designate an event or the like by the PC 200 and to acquire designated event data from the digital camera 100 even at a time other than a time of occurrence of an event. Such an operation to acquire event data will be described with reference to FIGS. 12 to 14.

Figure 12:
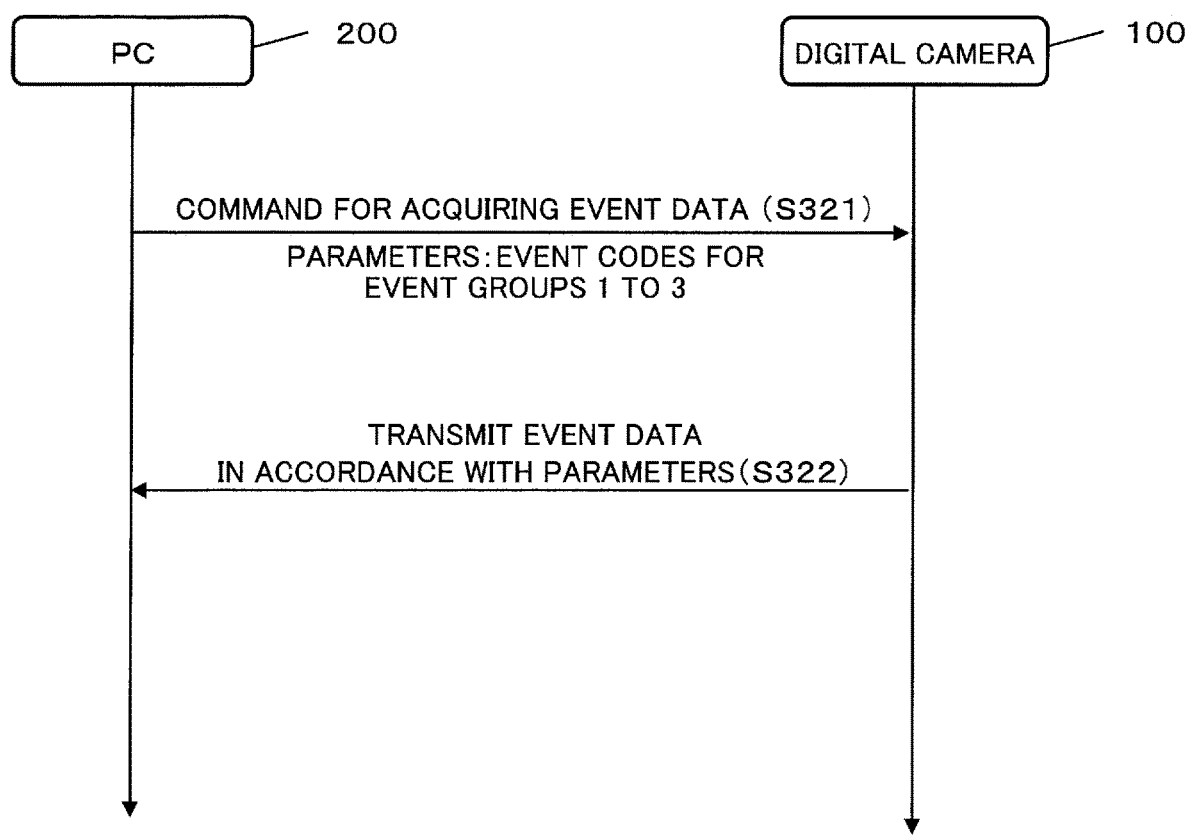
FIG. 12 is a sequence diagram illustrating an operation to acquire event data in the imaging system.

FIG. 12 is a sequence diagram illustrating an operation to acquire event data in the imaging system 1. FIGS. 13A and 13B illustrate commands for acquiring event data in the imaging system 1. FIG. 14 illustrates data acquired as a response to the command of FIG. 13.

The PC 200 transmits a command for requesting acquisition of event data, that is, a command for acquiring event data, to the digital camera 100 (S321). The command for acquiring event data includes a plurality of parameters specifying an event for which event data is to be acquired for each of the event groups 1 to 3, for example.

FIGS. 13A and 13B illustrate setting examples of parameters in the command for acquiring event data. In the respective command for acquiring event data D21a and D21b illustrated in FIGS. 13A and 13B, each of the parameters 1 to 3 corresponds to each of the event groups 1 to 3 in the setting data D1 illustrated in FIG. 7.

The command for acquiring event data D21a in FIG. 13A includes, in the parameter 1, an event code "0xC000" corresponding to the event group code of the setting data D1. According to the event code, all the events set in the event group 1 are designated, for example. In the example of FIG. 13A, while the parameter 2 is the same as described above for the event group 2, the parameter 3 stores a zero value indicating an unused state.

For example, the command for acquiring event data D21b in FIG. 13B includes an event code "0xC007" in the parameter 1. In such an event code, as in the notification data D20, by setting only a specific bit to "1" among the lower bits of the event group code, the event of the notification event tag associated with the specific bit is designated, for example.

Returning to FIG. 12, the controller 135 of the digital camera 100 receives the commands for acquiring event data D21a and D21b as described above, and transmits event data designated by each parameter to the PC 200 (S322). For example, as a response to the command for acquiring event data D21a, the event data of all the notification event tags 1 to 3 in each of the event groups 1 and 2 is transmitted. FIG. 14 illustrates a data structure of the event data of the event group 2 in the response to the command for acquiring event data D21a.

According to the operation to acquire event data as described above, the digital camera 100 transmits, to the PC 200, event data designated by the command for acquiring event data, the command being transmitted from the PC 200 (S321, S322). Thus, it is possible to acquire desired event data by the PC 200 at any timing not limited to timing of the event notification, for example.

1-3. Effects

As described above, the digital camera 100 of the present embodiment is an example of an imaging apparatus that notifies the external PC 200 (an example of a control device) of information in the digital camera 100. The digital camera 100 includes the USB connector 155 (an example of a communication circuitry) and the controller 135 (an example of a control circuitry). The USB connector 155 performs data communication with the PC 200. The controller 135 generates the notification data D20 to D30b in response to an event that a state of the digital camera 100 changes (S20 to S30B), and controls the USB connector 155 to transmit the notification data D20 to D30b to the PC 200 (S420 to S430B). The notification data D20 to D30b each includes the parameters 1 to 3 (an example of a data storage region) capable of storing event data which is an example of data indicating each state in events of a plurality of types.

According to the digital camera 100 described above, the notification data D20 to D30b each capable of storing event data are generated and transmitted to the PC 200 in response to various events. According to the data structure of the notification data D20 to D30b, it is possible to reduce the processing load in the data communication for notifying the PC 200 of the change in the camera state in the digital camera 100, that is, the event.

In the present embodiment, when an event occurs in the digital camera 100 (S20 to S30B), the controller 135 generates the notification data D20 to D30b, stores the event data as an example of data of the occurred event in the parameters 1 to 3 in the generated notification data D20 to D30b, and controls the USB connector 155 to transmit the notification data D20 to D30b storing the event data of the occurred event to the PC 200 (S420 to S430B). Consequently, the PC 200 can acquire the event data even when the digital camera 100 does not perform the data transmission in response to receiving the transfer request from the PC 200 (S401, S402) as in the LV image acquisition processing (S400) illustrated in FIG. 4.

In the present embodiment, when events of a plurality of types occur in the digital camera 100 (S20, S30B, or the like), the controller 135 generates one piece of notification data D20 or D30b each storing, in the parameters 1 to 3, event data of the occurred events of the plurality of types, and controls the USB connector 155 to transmit the one piece of notification data D20 or D30b to the PC 200 (S420, S430B). Therefore, events of a plurality of types can be collectively notified to the PC 200, and interrupt processing by event notification can be reduced.

In the present embodiment, the type of event for which the event data can be stored in the parameters 1 to 3 are set in advance (see FIGS. 7 and 9). When an event of the set type occurs in the digital camera 100 (S20), the controller 135 causes the USB connector 155 to transmit the notification data D20 (S420). When a different event occurs in the digital camera 100, the different event having a type different from the set type (S10), the controller 135 does not cause the USB connector 155 to transmit the notification data (see FIG. 5). Consequently, only the set event can selectively be notified among events of a plurality of types, and the excessive event notification can be suppressed to reduce the processing load on the data communication between the digital camera 100 and the PC 200.

In the present embodiment, the USB connector 155 receives, from the PC 200, the setting data D1 that defines the type of event for which the event data can be stored in the parameters 1 to 3 (S302). Therefore, the digital camera 100 can perform an event notification operation based on the setting data D1 received by the USB connector 155 (S420 to S430B).

In the present embodiment, the notification data D20 to D30b further includes an event code (an example of an event identifier) indicating the type of event for which the event data is stored in the parameters 1 to 3. Therefore, the PC 200 can recognize the type of event of which the event data is included in the received notification data D20 to D30b.

In the present embodiment, as an example of a plurality of groups classifying events of a plurality of types that can be stored in the parameters 1 to 3, event groups are set in advance (see FIGS. 7 and 9). For each event group, the controller 135 generates the notification data D20 to D30b each storing, in the parameters 1 to 3, event data of respective events of a plurality of types included in the event group (S420 to S430B). Therefore, events of a plurality of types to be collectively notified at a time can be easily managed, for example.

In the present embodiment, the digital camera 100 constitutes an imaging apparatus that captures an image to generate image data. The event is a change in state of at least one of setting information regarding AF control, setting information regarding AE control, information regarding image recording such as the number of pictures that can be shot and the available video recording time, and setting menu information, respectively as an example of each of the in-focus state, the exposure state, the recording state regarding image capturing in the digital camera 100, and the operation state by the user of the digital camera 100.

In the present embodiment, when the LV image (an example of image data of image being captured) is sequentially transmitted via the USB connector 155 to the PC 200 (S400), the controller 135 controls the transmission of the notification data D20 to D30b each in response to the event occurring in the digital camera 100 (S420 to S430B). According to the event notification operation (S420 to S430B), the PC 200 can acquire the LV image (S400) with low latency while receiving various event notifications from the digital camera 100. The imaging system 1 may constitute a tether system that connects the digital camera 100 and the PC 200, for example.

The PC 200 of the present embodiment is an example of a control device to which information is notified from the external digital camera 100 (an example of an imaging apparatus). The PC 200 includes the device I/F 255 (an example of a communication circuitry) and the controller 235 (an example of a control circuitry). The device I/F 255 performs data communication with the digital camera 100. The controller 235 controls an operation to receive, from the digital camera 100 via the device I/F 255, the notification data D20 to D30b in response to an event indicating that a state of the digital camera 100 changes (S420 to S430B). The notification data D20 to D30b includes the parameters 1 to 3 (an example of a data storage region) capable of storing event data as an example of data indicating each state in events of a plurality of types. The controller 235 sets the setting data D1 defining the type of event for which the event data can be stored in the parameters 1 to 3 in the notification data D20 to D30b, and transmits the set setting data D1 to the digital camera 100 via the device I/F 255 (S301, S302).

According to the PC 200 described above, the reception of the notification data D20 to D30b is controlled based on the setting data D1 transmitted to the digital camera 100, whereby the processing load in the data communication for notifying the PC 200 of the event in the digital camera 100 can be reduced.

Furthermore, in the digital camera 100 of the present embodiment, when an event occurs in the digital camera 100 (S20 to S30B), the controller 135 includes event data in the notification data D20 to D30b (examples of data each indicating a state changes in the occurred event), and controls the USB connector 155 to transmit the notification data D20 to D30b to the PC 200 (S420 to S430B). Therefore, in the notification data D20 to D30b, the event data of each event can be transmitted together with the event notification.

In the digital camera 100 of the present embodiment, when events of a plurality of types occur in the digital camera 100 (S20, S30B, or the like), the controller 135 generates one piece of the notification data D20 or D30b including data of respective occurred events of a plurality of types, and controls the USB connector 155 to transmit the one piece of the notification data D20 and D30b to the PC 200 (S420, S430B). Therefore, events of a plurality of types can be collectively notified to the PC 200 by one piece of the notification data D20 and D20b, or the like.

In the digital camera 100 of the present embodiment, the controller 135 causes the USB connector 155 to transmit the notification data D20 to D30b (S20 to S30B) when a predetermined event occurs in the digital camera 100, the predetermined event having a preset type (S420 to S430B), and does not cause the USB connector 155 to transmit the notification data (see FIG. 5) when a different event occurs in the digital camera 100, the different event having a type different from the preset type (S10). Therefore, only the event of the type set in advance can be selectively notified to the PC 200.

Modification of First Embodiment

Figure 15A:
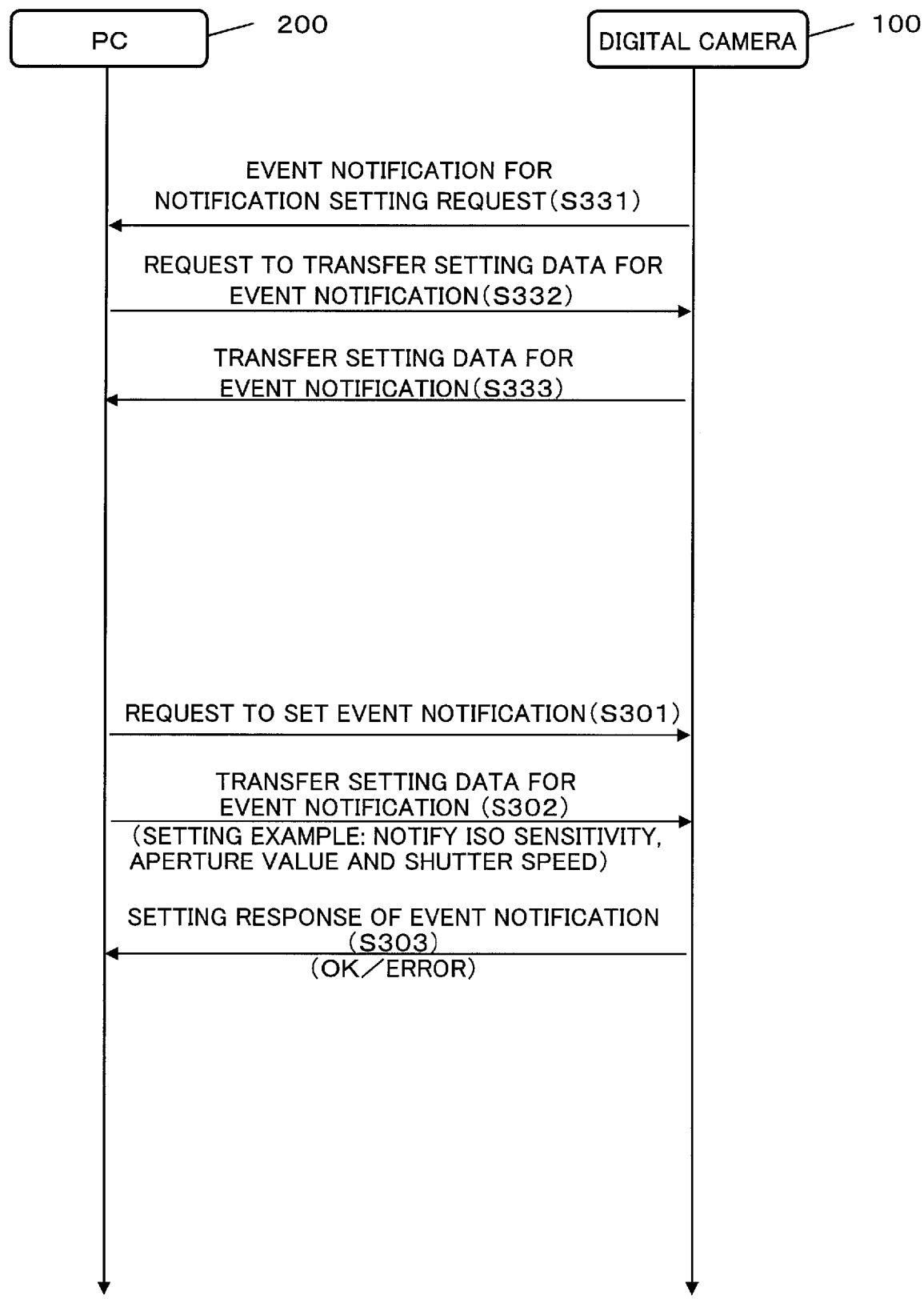
FIG. 15A is a sequence diagram illustrating an operation to set the event notification in an imaging system of a modification of the first embodiment.

In the first embodiment described above, the operation of the imaging system 1 in which the event notification is set from the PC 200 (FIG. 6) is described, but the event notification may be set in the digital camera 100. Such a modification will be described with reference to FIG. 15. FIG. 15 is a sequence diagram illustrating an operation to set event notification in the imaging system 1 of the modification of the first embodiment.

In the present modification the digital camera 100 receives, on the operation I/F 150, a user operation setting the type of event to be included in the event notification, and transmits, to the PC 200, an event notification for a notification setting request to request setting for the event notification (S331), for example. For example, in step S331, the digital camera 100 generates setting data D1 in accordance with the user operation and stores the setting data D1 in the buffer memory 125 or the like. The digital camera 100 receives the transfer request for the setting data D1 from the PC 200 in response to the PC200 receives the notification setting request (S332), and transmits the setting data D1 to the PC 200 (S333). Using the received setting data D1, the PC 200 performs an operation to set event notification as in FIG. 6 (S301 to S303), for example.

According to the above operation, it is possible to set event notification from the digital camera 100 (S331 to S333, S301 to S303) using the sequence of event notification setting common to the first embodiment (FIG. 6). The setting for the event notification in the digital camera 100 is not limited to the above example. For example, in the digital camera 100, the event notification may be set based on the setting data D1 transmitted in step S333, and the processing in steps S301 to S303 may be omitted.

In addition, the event notification for notification setting request (S331) is not limited to in the case where the user operation is received in the digital camera 100, and may be performed in a case where an increase in processing load in each controller 135, 235 of the digital camera 100 or the PC 200 is assumed, for example. In this case, step S333 may be performed using the setting data D1 set in advance in the digital camera 100 and stored in the buffer memory 125 or the like, for example.

As described above, in the present embodiment, the digital camera 100 (an example of an imaging apparatus) further includes the operation I/F 150 that receives a user operation setting a type of event for which the event data can be stored in the parameters 1 to 3 (an example of a data storage region). Therefore, the setting data D1 can be generated according to the user operation, and the event notification operation based on the generated setting data D1 can be performed (S420 to S430B).

Further Modification of First Embodiment

In the modification of the first embodiment described above, the imaging system 1 that receives, in the digital camera 100, the user operation setting the type of the event to be included in the event group is described. Setting the event group is not limited to the above example. For example, the digital camera 100 may automatically determine the event group, grouping events to be notified preferentially in accordance with various capturing settings and operation modes. Such a modification will be described with reference to FIGS. 15B to 15F.

Figure 15B:
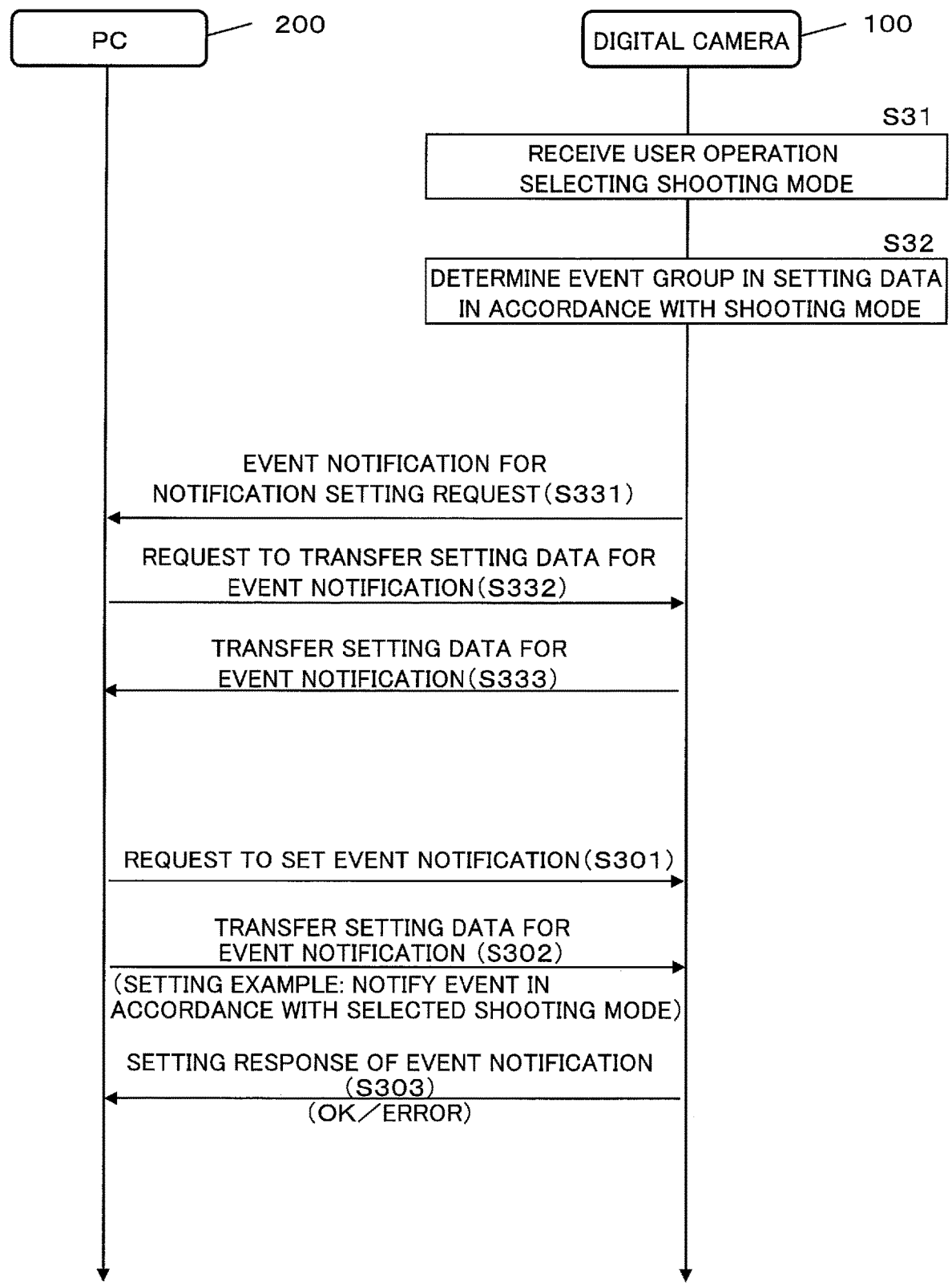
FIG. 15B is a sequence diagram illustrating an operation to set the event notification in an imaging system of a further modification of the first embodiment.

FIG. 15B is a sequence diagram illustrating an operation to set event notification in an imaging system 1 of a further modification of the first embodiment. For example, at the start of the processing of steps S331 to S333 and S301 to S303 similar to FIG. 15A, the digital camera 100 of the present modification performs automatic setting of an event group in response to selection of a shooting mode by a user (S31, S32).

For example, the digital camera 100 receives a user operation selecting a shooting mode on the mode dial of the operation interface 150 (S31). For example, shooting modes of the digital camera 100 includes a program (P) mode, an aperture priority (A) mode and a shutter priority (S) mode for mainly capturing a still image, and a video shooting mode for capturing a moving image. Each of the modes P, A, and S is a shooting mode in which the digital camera 100 operates differently depending on automatic setting or user setting of an aperture value, a shutter speed, and the like related to capturing of a still image.

When such a user operation selecting a shooting mode is input in the digital camera 100 (S31), the controller 135 determines an event group in the setting data for the event notification in accordance with the selected shooting mode (S32). For example, when the shooting mode selected by the user operation is a program mode, the controller 135 sets an event group in accordance with the program mode in the setting data (S32).

FIG. 15C illustrates setting data D31 in the program mode in the imaging system 1 of the present modification. In the setting data D31 of FIG. 15C, the event group 1 includes the ISO sensitivity, the shutter speed, and the aperture value from a viewpoint of dynamic control in the program mode. The event group 2 includes three types of events related to recording still images from a viewpoint of user operations in the program mode. The event group 3 is unused as in the setting data D1 of the first embodiment, for example.

For example, the event group 1 of the setting data D31 is managed to group the events automatically changed by exposure control in the program mode. Furthermore, in another event group 2 or the like, types of events that occur due to setting changes by the user are managed, for example. For example, such management information for each shooting mode is stored in advance in the flash memory 145 or the like of the digital camera 100.

In step S32 of FIG. 153, the controller 135 determines the event group 1 in accordance with the program mode and other event groups by referring to the management information described above, to generate the setting data D31, for example. Thereafter, the digital camera 100 of the present modification performs processing of transmitting the generated setting data D31 to the PC 200 as in FIG. 15A (S331 to S333), for example. Using the received setting data D31, the PC 200 performs an operation to set the event notification as in FIG. 6 (S301 to S303), for example.

FIG. 15D illustrates setting data D32 for the event notification in the aperture priority mode in the imaging system 1 of the present modification. For example, when receiving a user operation to change the shooting mode to the aperture priority mode from the program mode or the like (S31), the digital camera 100 determines an event group in accordance with the aperture priority mode to generate the setting data D32 (S32).

In the setting data D32 of the aperture priority mode illustrated in FIG. 15D, the aperture value is set in the notification event tag 3 of the event group 2, while in the setting data D31 of the program mode (FIG. 15C), the aperture value is originally set in the notification event tag 3 of the event group 1. As described above, event groups in the aperture priority mode are determined such that an event of the aperture value is notified in the event group 2 managing events due to setting changes by the user, separately from the event group 1 of the ISO sensitivity and the shutter speed. In the example of FIG. 15D, the notification event tag 3 of the event group 1 is unused.

When the shooting mode is the aperture priority mode in the digital camera 100, it is considered that the respective events of the ISO sensitivity and the shutter speed, other than the aperture value, frequently occur at similar timings in the automatic control of exposure, for example. On the other hand, since the event of the aperture value occurs due to a setting change or the like by a user operation in the aperture priority mode, it is considered that events of the aperture value occur less frequently than events of the ISO sensitivity and the shutter speed. In the digital camera 100 of the present modification, in the setting data D32, the event group in accordance with the aperture priority mode is determined (S32), so that it is possible to collectively notify events that frequently occur in the exposure control, while separately notifying the event of the aperture value in which user settings are prioritized, for example.

On the other hand, in the program mode, since the aperture value is automatically controlled in the digital camera 100 in addition to the ISO sensitivity and the shutter speed, it is assumed that an occurrence frequency of events due to changes of the aperture value is relatively high, as in the ISO sensitivity and the shutter speed. Therefore, in the program mode, by including the ISO sensitivity, the shutter speed, and the aperture value in the same event group as illustrated in the setting data D31 of FIG. 15C, for example, it is possible to collectively notify the events with high frequency in the exposure control and reduce the communication load of the event notification.

Furthermore, FIG. 15E illustrates setting data D33 for the event notification in the shutter priority mode in the imaging system 1 of the present modification. When receiving a user operation selecting the shutter priority mode (S31), the digital camera 100 determines an event group in accordance with the shutter priority mode, as in the case of the setting data D32, to generate the setting data D33 (S32), for example.

In the setting data D33 of the shutter priority mode illustrated in FIG. 15E, the shutter speed is set in the notification event tag 3 of the event group 2 managing events due to setting changes by the user, while the shutter speed is included in the event group 1 in the setting data D31 of the program mode. As described above, in the shutter priority mode, in response to giving priority to the user setting for the shutter speed, it is possible to collectively notify other events with high frequency in the exposure control in the shutter priority mode.

Furthermore, FIG. 15F illustrates setting data D34 for the event notification in the video shooting mode in the imaging system 1 of the present modification. When receiving a user operation selecting the video shooting mode (S31), the digital camera 100 determines an event group in accordance with the video shooting mode, as in the cases of the setting data D31 to D33 of various shooting modes of a still image, to generate the setting data D34 (S32), for example.

In the setting data D34 illustrated in FIG. 15F, the event group 1 includes two types of events automatically changed during recording of the moving image in the video shooting mode, and the event group 2 includes one type of event due to a setting change by the user regarding recording of the moving image. As illustrated in the setting data D34 of FIG. 15F, in the video shooting mode, it is possible to collectively notify the events with high frequency in video shooting, while separately notifying an event set by the user.

As described above, according to the imaging system 1 of the present modification, the event notification can be set by grouping types of events in consideration of occurrence frequencies and the like assumed for the events, in accordance with the shooting mode of the digital camera 100. Therefore, by collectively notifying events having similar occurrence frequencies, a frequency of the event notification can be suppressed, and the communication load between the digital camera 100 and the PC 200 can be reduced. In addition, when the event groups 1 and 2 are determined as in the setting data D31 to D34, the notification of the event group 2 becomes less frequently than the notification of the event group 1, and as a result, frequently changed events of the event group 1 can be notified preferentially, for example.

In the above example, an example is described in which the management information on events in the event group is used for the processing of step S32, the management information being stored in advance for each shooting mode in the digital camera 100. The processing of determining the event group (S32) is not particularly limited thereto. For example, the controller 135 may record occurrence time and an occurrence frequency for each type of event when capturing images in each shooting mode, and perform the processing of step 32 to include specific types of events in the same event group 1, such that the specific types of events occur within a predetermined period that can be regarded as simultaneous and having a difference in the occurrence frequencies within a predetermined threshold value. Furthermore, the events to be notified in another event group 2 or the like may be set by a user operation or the like in the PC 200 or the digital camera 100, as in the operation of FIG. 6 or FIG. 15A, or the setting before the shooting mode is changed may be used without any change.

In addition, in the setting data D32 and D33, the notification event tags 3 and 2 of the event group 1 are unused respectively in an example described above, while the aperture value and the shutter speed are set in the notification tags 3 and 2 respectively in the setting data D31 of the program mode. In the setting data D32 and D33, another event may be appropriately set in the respective notification tags unused in the above example. Furthermore, in the imaging system 1 in the above example, events of the event group 1 are notified preferentially as a result of grouping in accordance with the shooting mode. Different processing for the event notification may be performed in accordance with a priority set in advance among the event groups. For example, the notification data of the event group 1 may be received by the PC 200 in response to the occurrence of the event in the similar manner to the processing of FIG. 10, and the notification data of the event group 2 may be transmitted from the digital camera 100 in response to an acquisition request from the PC 200.

As described above, in the present embodiment, the controller 135 (an example of a control circuitry) of the digital camera 100 (an example of an imaging apparatus) determines an event group (an example of a group classifying a plurality of types of events) in the setting data D31 to D34 that defines types of events for which event data can be stored in each of the parameters 1 to 3 (an example of a data storage region) of the notification data (S32). In this way, the event group is automatically set in the digital camera 100. Thus, even without a particular setting by the user, event notification using an event group can be performed, and therefore a processing load on communication between the digital camera 100 and the PC 200 can be reduced, for example.

In the present embodiment, the digital camera 100 further includes the operation interface 150 that receives a user operation selecting a shooting mode (an example of an image shooting mode) from a plurality of shooting modes of the digital camera 100. The controller 135 determines the event group in accordance with the shooting mode selected in the operation interface 150 (S31, S32). Therefore, for each shooting mode, the event group can be determined in accordance with the occurrence frequency, timing, and the like depending on the type of event, and the frequency of the event notification can be suppressed, for example. Thus, the processing load on the communication between the digital camera 100 and the PC 200 can be reduced.

In the present embodiment, the controller 135 controls a USE connector 155 (an example of a communication circuitry) to transmit the generated setting data D31 to D34 (S32), each as an example of setting information indicating the event group in each of the setting data D31 to D34, to the PC 200 (an example of a control device) (S331 to S333). Therefore, the event notification can be set by processing similar to setting from the PC 200 (S301 to S303), for example.

In the present embodiment, a controller 235 (an example of a control circuitry) of the PC 200 (an example of a control device) receives, from the digital camera 100 (an example of an imaging apparatus) via a device I/F 255 (an example of a communication circuitry), the setting data D31 to D34 generated by the digital camera 100, as an example of setting information indicating an event group (an example of a group that classifies a plurality of types of events) (S331 to S333). The controller 235 sets, in the PC 200, the setting data D31 to D34, based on the received setting information of the event group, the setting data D31 to 034 each defining a type of event for which event data can be stored in each of the parameter 1 to 3 (an example of a data storage region) in the notification data, and transmits the set setting data D31 to D34 to the digital camera 100 via the device I/F 255 (S301, S302). Thus, the event notification can be set by the processing similar to the setting from the PC 200 (S301 to S303), for example.

Furthermore, in the digital camera 100 of the present embodiment, the controller 135 determines an event group in the setting data D31 to D34 that define types of events to be included in the notification data, the event group classifying a plurality of types of events (S32). When an event is caused in the digital camera 100 (S20 to S30B), the controller 135 include event data of the caused event (an example of data indicating a state that changes in the caused event) in the notification data, and controls the USB connector 155 to transmit the notification data to the PC 200 (S420 to S430B). Thus, the event notification using the event group can be performed based on the setting data D31 to D34, for example.

Second Embodiment

Hereinafter, a second embodiment of the present disclosure will be described with reference to FIGS. 16 to 20. In the first embodiment, the imaging system 1 that controls the event notification based on the type of event is described. In the second embodiment, the imaging system 1 that thins out event notifications in a plurality of events will be described.

Hereinafter, description of configurations and operations similar to those of the imaging system 1 according to the first embodiment will be omitted as appropriate, and the imaging system 1 according to the present embodiment will be described.

2-1. Event Notification Operation

An event notification operation in the imaging system 1 of the present embodiment will be described with reference to FIGS. 16 and 17. In the present system 1, a thinning interval such as a time interval at which a plurality of events occur in the digital camera 100 or a ratio of the number of times of occurrence can be set, as an interval at which event notifications are thinned out.

Figure 16:
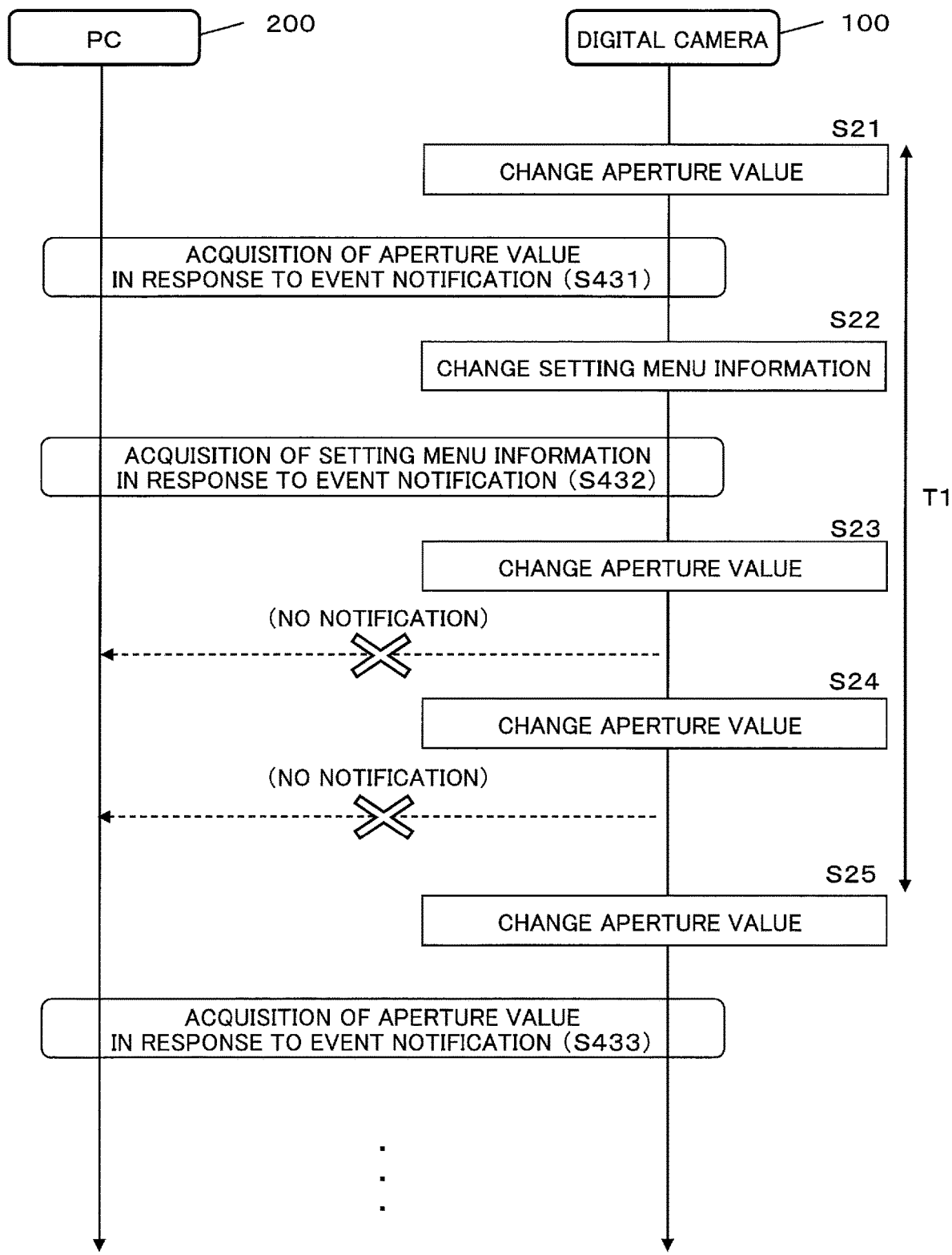
FIG. 16 is a sequence diagram for explaining an event notification operation in accordance with a time interval in an imaging system of a second embodiment.

FIG. 16 is a sequence diagram for explaining an event notification operation in accordance with a time interval in the imaging system 1 of the present embodiment. FIG. 17 is a sequence diagram for explaining an event notification operation in accordance with the number of times in the present system 1.

Figure 17:
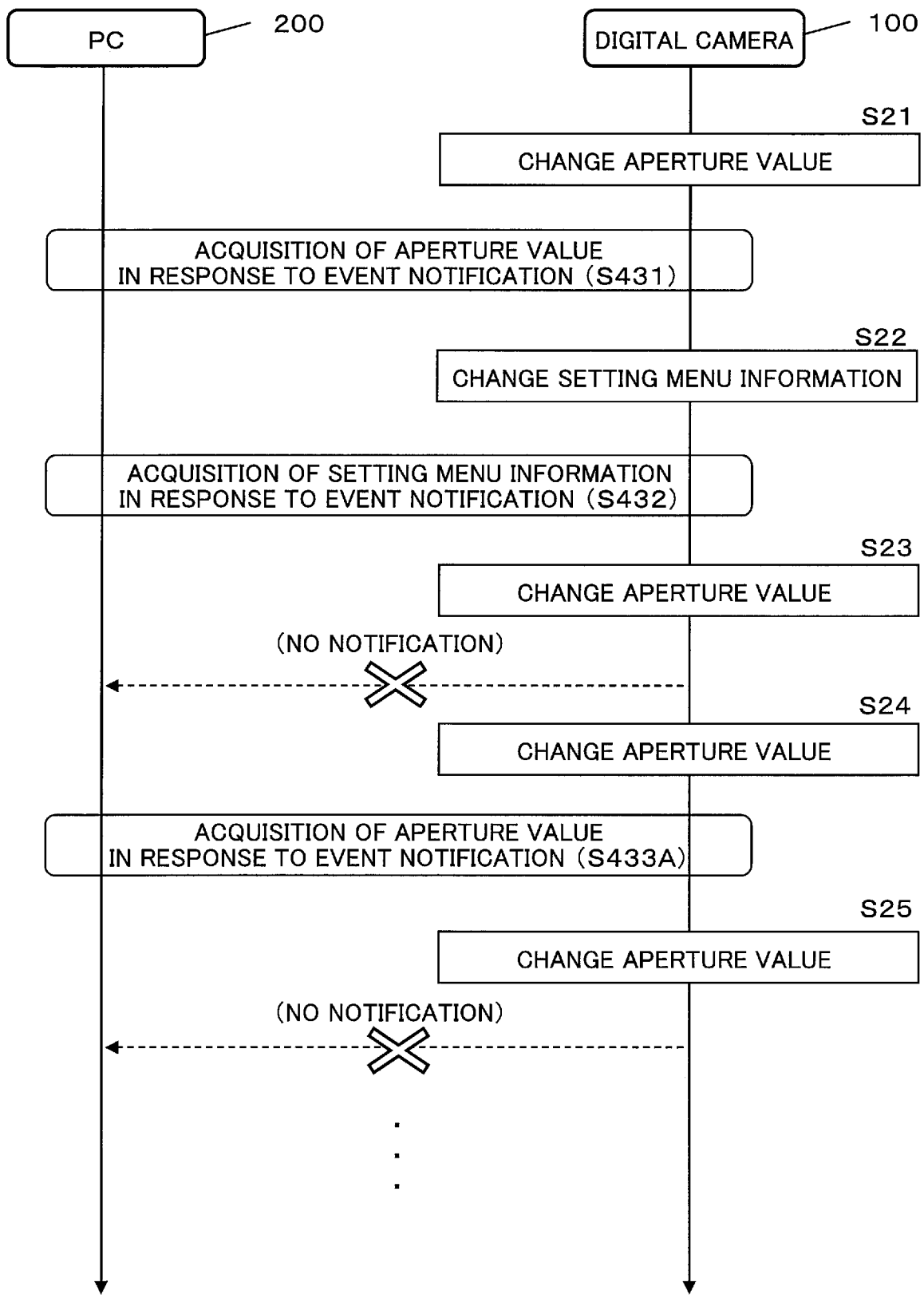
FIG. 17 is a sequence diagram for explaining an event notification operation in accordance with the number of times in the imaging system of the second embodiment.

FIGS. 16 and 17 illustrate examples in which, in a case where event thinning setting (described later) is performed in advance in the present system 1, events such as a change in the setting menu information (S22) and changes in the aperture value in multiple times (S21, S23 to S25) occurs during the LV display similar to that in FIG. 4.

In the example of FIG. 16, in the digital camera 100, a predetermined time interval T1 (for example, 100 milliseconds (ms)) is set as the thinning interval for an event of a specific type such as a change in the aperture value. In this case, when notifying the PC 200 of an event of this specific type, the digital camera 100 restricts event notification to events occurring at the time interval T1 (S21, S25) (S431, S433). That is, the digital camera 100 does not notify of an event occurring within the time interval T1 (S23, S24) after once notifying the PC200 of the event to be thinned out (S431).

On the other hand, for an event of a type different from the type for which the thinning interval is set, such as for a change in the setting menu information (S22), the digital camera 100 performs event notification even when the event occurs within the time interval T1 (S432). In the operation of each event notification (S431 to S433), the digital camera 100 transmits notification data including event data to the PC 200 as in the first embodiment, for example.

In the example of FIG. 17, the change in the aperture value is set as the thinning target as in FIG. 16, and the predetermined ratio of the number of times of occurrence (e.g., once every 2 times) is set as the thinning interval. In this case, after notifying the PC 200 of an event of the change in the aperture value in step S21 (S431), the digital camera 100 does not notify an event of this type occurring within the interval of 2 times (S23), but notifies an event of this type occurring at the interval of 2 times (S24) (S433A). Similarly, the first change in the aperture value from the notification in step S433A (S25) is not notified. On the other hand, as in the example of FIG. 16, an event of a type different from the thinning target (S22) is notified regardless of the ratio of the number of times of occurrence (S432).

As described above, the digital camera 100 of the present embodiment controls transmission of notification data to notify the PC 200 of a thinned out event among a plurality of events, the thinned out event occurring at a thinning interval such as a time interval and a ratio of the number of times of occurrence. By restricting the event notification by such a thinning interval, it is possible to reduce the processing load on the communication between the digital camera 100 and the PC 200 due to the occurrence of a plurality of events, and it is possible to avoid frequent occurrence of interrupt processing and to suppress the delay of the LV display for example.

2-2. Event Thinning Setting

An operation for event thinning setting to set a thinning interval in the imaging system 1 will be described with reference to FIGS. 18 and 19.

Figure 18:
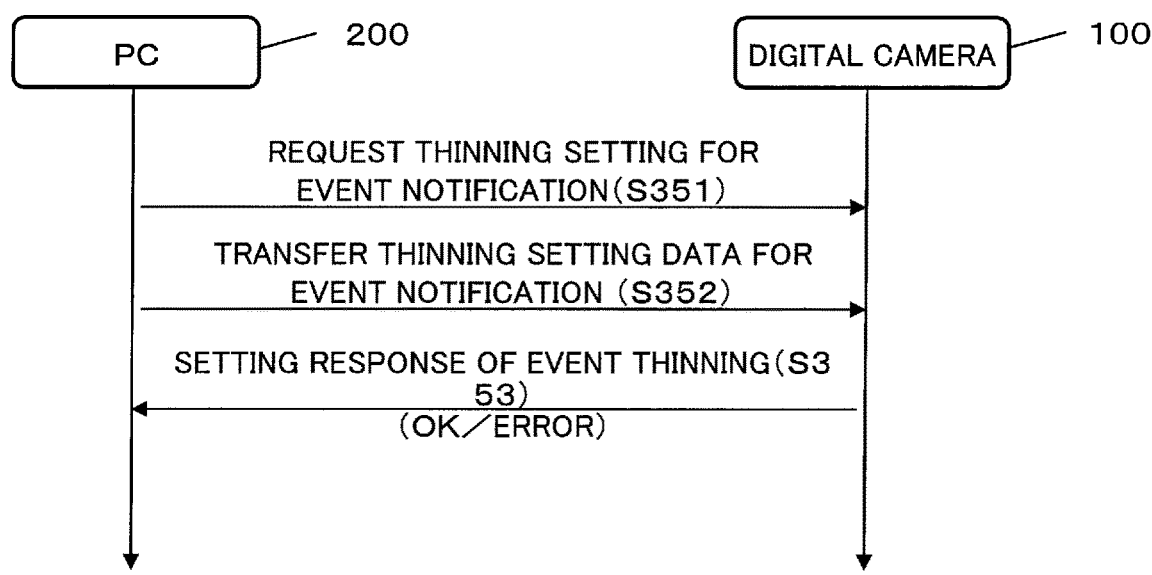
FIG. 18 is a sequence diagram illustrating an operation for event thinning setting in the imaging system of the second embodiment.

FIG. 18 is a sequence diagram illustrating an operation for event thinning setting in the imaging system 1 of the present embodiment. FIG. 19 is a diagram illustrating thinning setting data D50 for an event notification.

First, the PC 200 issues, via the device I/F 255, a command for requesting the digital camera 100 to perform setting for thinning event notifications (step S351), as in the sequence of the event notification setting (step S6), for example. The PC 200 transmits, to the digital camera 100, thinning setting data D50 (see FIG. 19) that defines a thinning interval for event notifications (step S352). The thinning setting data D50 is generated in advance in the PC 200, and is held in the storage 245 or the like, for example.

In steps S351 and S352, the digital camera 100 receives the setting request and the thinning setting data D50 by the USB connector 155, for example. When receiving the thinning setting data D50, the digital camera 100 transmits a setting response of "OK" or "Error" to the PC 200 (S353), for example.

According to the above thinning setting operation, in the imaging system 1, the thinning setting data D50 for an event notification can be set in the digital camera 100 from the PC 200. The sequence illustrated in FIG. 19 may be started in response to a user operation starting setting in the PC 200 or in response to a processing load in the controller 235, for example. The thinning setting data D50 will be described below with reference to FIG. 19.

The thinning setting data D50 illustrated in FIG. 19 includes "Item" and "Value" of each item. In the example of FIG. 19, the items of the setting data D50 include "Thinning Target Event" that designates an event to which a thinning interval is applied, "Thinning Type" that designates a time interval or the number of times as a thinning interval, and "Update Interval" and "Set Number of Times" responding to the thinning type. "Update Interval" indicates a valid value when the thinning type is the time interval, that is, a value that can be referred to in the processing for thinning event notification. "Set Number of Times" indicates a value which is valid when the thinning type is the number of times. In FIG. 19, the value "*" indicates an arbitrary integer in a range from "0" to "F" in hex number.

The thinning target event is set in accordance with a predetermined specified code in which each bit is associated with a type of event in a 4-byte value, for example. For example, the event of each type is set as a thinning target event when the corresponding bit of the specified code is "1", and is not set as a thinning target event when the corresponding bit is "0". For example, when the value of the specified code (in hexadecimal number) is "0x00000004", that is, the third lower bit (in binary number) is "1", the event related to the change in the ISO sensitivity may be set as the target of the thinning control. In addition, when a plurality of bits is "1", a plurality of corresponding events may be set as targets for the thinning control. Furthermore, when all bits are the maximum value "F", events of all types may be set as the thinning target events, for example.

In the thinning type, in a 1-byte value, the time interval is set as the thinning interval in a case of "0x*1", and the number of times is set as the thinning interval in a case of "0x*2", for example. In addition, when events of a plurality of types are set as the thinning target events, a plurality of values corresponding to the event of each type may be stored in the thinning type, for example. For example, in this case, events for setting the thinning type may be specified in descending order of the values of the thinning target events, by the upper four bits of the value of the thinning type. For example, in the case of "0x01", the time interval is set as the thinning interval for the event designated by the minimum value among the events set as the thinning target events.

As the update interval, the time interval T1 equal to or longer than a predetermined lower limit value (for example, 10 milliseconds) can be set by a 2-byte value indicating a time interval in a predetermined unit (for example, milliseconds), for example. As the set number of times, a value indicating a ratio of the number of times of occurrence of two or more times can be set by a 2-byte value, for example. The update interval and the set number of times may be defined so as not to be referred to in the event notification operation when the maximum value is set, for example.

The thinning setting data D50 as described above is generated, in the PC 200 according to a user operation input to the operation I/F 230, for example. In addition, without being limited to the user operation, the PC 200 may automatically generate the thinning setting data D50 according to the processing load of the controller 235, for example. Furthermore, the thinning setting data D50 is not limited to be set by the user operation in the PC 200, and may be set according to a user operation input in the operation I/F 150 in the digital camera 100, for example.

2-3. Operation of Digital Camera

In the imaging system 1 of the present embodiment, the event notification operation illustrated in FIGS. 16 and 17 is performed based on the thinning setting data D50 as described above, for example. Processing in which the digital camera 100 thins out the event notification in the event notification operation of the present embodiment will be described with reference to FIG. 20.

Figure 20:
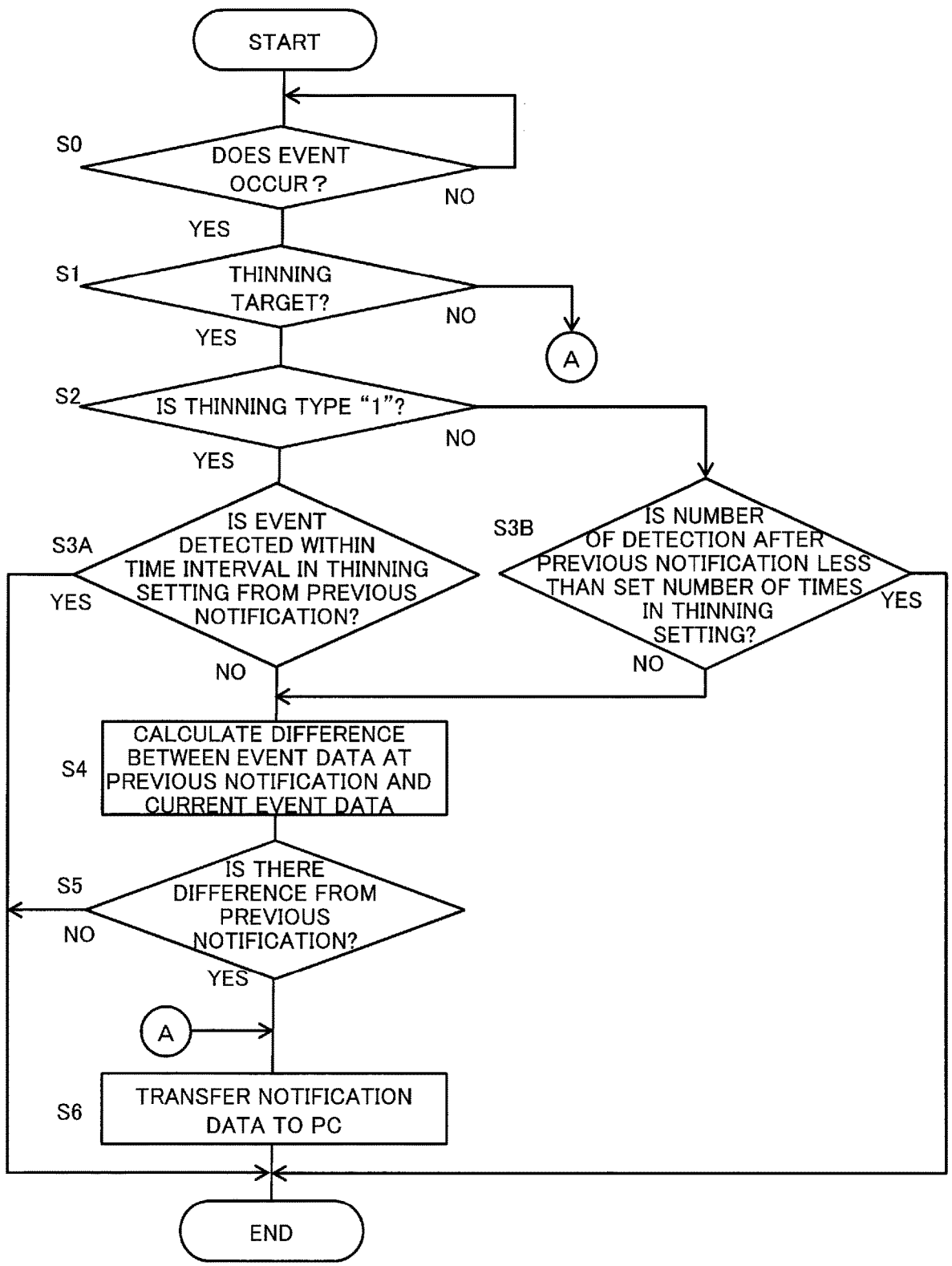
FIG. 20 is a flowchart illustrating an event notification operation in a digital camera of the second embodiment.

FIG. 20 is a flowchart illustrating an event notification operation in the digital camera 100 of the present embodiment. This flowchart is started in a state where the thinning setting data D50 issued by a command from the PC 200 is stored in the buffer memory 125 or the like, for example. Each processing of this flowchart is performed by the controller 135 of the digital camera 100, and is repeated at a predetermined cycle such as a frame cycle, for example.

First, the controller 135 detects whether an event occurred in the digital camera 100 (S0). For example, the controller 135 detects whether various camera states are changed based on an operation state of the digital camera 100 and inputs of various user operations. When occurrence of an event is not detected (NO in S0), the controller 135 repeats detection in step S1 at a predetermined cycle, for example.

When occurrence of an event is detected (YES in S0), the controller 135 determines whether the detected event corresponds to a thinning target event with reference to the thinning setting data D50 (S1), for example.

When the detected event does not correspond to the thinning target event (NO in S1), the controller 135 notifies the PC 200 of the detected event as described later (S6) without particularly performing the processing of thinning the event notification, that is, without thinning control.

When the detected event corresponds to the thinning target event (YES in S0), the controller 135 determines whether the thinning type of the detected event is "1" with reference to the thinning setting data D50 (S2), for example.

(1) Thinning Control by Time Interval

When the thinning type of the detected event is "1" (YES in S2), thinning control by the time interval is performed as illustrated in FIG. 16 (S3A to S6).

For example, the controller 135 determines whether the time of the current detection of the event to be thinned out (S0) is within the time interval set in the thinning setting data D50, that is, within the range of the update interval, from the time of the detection of the event of the type previously notified to the PC 200 (S3A). For example, the digital camera 100 may hold a timer variable for managing the detection time for each event in the buffer memory 125 or the like. In the example of FIG. 16, after the event notification for the change in the aperture value (S431), it is determined whether each time of detection of the event of the type (S23 to S25) is within the range of the time interval T1 from the time of detection of step S21 (S3A).

When the time of the current detection (S0) is not within the range of the update interval from the previous notification (NO in S3A), the controller 135 calculates a difference between the event data at the previous event notification and the current event data (S4). The event data is stored in the buffer memory 125 or the like at the time of event notification (S6), for example. In the example of FIG. 16, the time of detection in step S25 is not within the range of the time interval T1 from the time of detection in step S21 (NO in S3A). In this case, a difference in the event data between the time of the previous notification (S431) and step S25 is calculated.

Based on the difference in the calculated event data, the controller 135 determines whether there is a difference in the camera state for the event of the type from the time of the previous notification of the event detected in step S0 (S5).

When there is a difference from the time of the previous notification (YES in S5), the controller 135 transmits notification data including the event data of the event detected in step S0 to the PC 200 via the USB connector 155 (S6). In the example of FIG. 16, at the time of detection in step S25, the notification data is transmitted only when the aperture value is different from that at the time of the previous notification (S431) (YES in S5, S433). The controller 235 of the PC 200 receives the notification data from the device I/F 255, and acquires the stored event data (S433), for example.

On the other hand, when there is no difference from the time of the previous notification (NO in S5) and when the time of the current detection (S0) is within the range of the update interval from the previous notification (YES in S3A), the controller 135 ends the processing of this flowchart without transmitting the notification data (S6). In the example of FIG. 16, the PC 200 is not notified of the change in the aperture value within the range of the update interval T1 (S23, S24).

(2) Thinning Control by Number of Times of Event

On the other hand, when the thinning type of the detected event is "2" and is not "1" (NO in S2), the event notification operation corresponding to the number of times of occurrence of the event is performed as illustrated in FIG. 17 (S3B to S6).

For example, based on the thinning setting data D50, the controller 135 determines whether the number of times of detection after the previous notification regarding the event to be thinned out is less than the set number of times (S3B). For example, the digital camera 100 may hold a counter that manages the number of times of detection for each event in the buffer memory 125 or the like.

For the event detected in step S0, when the number of times of detection after the previous notification is not less than the set number of times (NO in S3B), the controller 135 calculates a difference between the event data at the time of the previous event notification and the event data at the time of the current detection (S4), for example. Thereafter, the controller 135 determines whether there is a difference in the camera state from the time of the previous notification as in the case of the thinning control by the time interval (S5), and when there is a difference (YES in S5), the controller 135 transmits the notification data of the event detected in step S1 to the PC 200 (S6). In the example of FIG. 17, the set number of times for the change in the aperture value is "2 times", and when an event of this type is detected for the second time after the previous notification (S431) (S24), notification data is transmitted (NO in S3B, S433A).

When there is no difference in the camera state from the time of the previous notification (NO in S5), or when the number of times of detection after the previous event notification is less than the set number of times (YES in S3B), the controller 135 ends the processing of this flowchart without transmitting the notification data. In the example of FIG. 17, when the change in the aperture value is detected for the first time (YES in S23 and S3B) after the previous notification (S431), the notification data is not transmitted.

According to the above processing, the digital camera 100 restricts the event to be notified to the PC 200, among the plurality of events that occur in the digital camera 100 (S21 to S25), based on the thinning interval such as the preset time interval and number of times (S431 to S433A). As described above, the digital camera 100 of the present embodiment can suppresses excessive event notification by using the thinning interval that can be easily set, therefore can facilitate to reduce the processing load on the communication between the digital camera 100 and the PC 200 due to the occurrence of the event.

Furthermore, in the above processing, when an event of the thinning target occurs again after the set time interval elapsed (YES in S0), the digital camera 100 determines the whether the camera state regarding the event changes from the time of the previous notification (S5). Therefore, it is possible to omit unnecessary event notification in which the camera state is the same as the camera state at the time of the previous notification. When the set time interval elapses, the digital camera 100 may perform the determination in step S5 regardless of whether the event occurs, and may transmit the notification data when there is a change.

2-4. Effects

As described above, the digital camera 100 of the present embodiment is an example of an imaging apparatus that notifies the external PC 200 (an example of a control device) of information in the digital camera 100. The digital camera 100 includes the USB connector 155 (an example of a communication circuitry) and the controller 135 (an example of a control circuitry). The USE connector 155 performs data communication with the PC 200. The controller 135 generates notification data in response to an event that a camera state (an example of a state of the digital camera 100) changes (S21 to S25), and controls the USB connector 155 to transmit the notification data to the PC 200 (S431 to S433A). The controller 135 controls the USB connector 155 based on a preset thinning interval, to restrict transmission of the notification data to a specific event occurring at a thinning interval (NO in S3A, NO in S3B) among a plurality of events (S21, S23 to S25) occurring in the digital camera 100 (S431, S433, S433A).

According to the digital camera 100 described above, among the plurality of events, an event to be notified to the PC 200 is restricted based on the preset thinning interval. Therefore, it is possible to reduce a processing load on communication between the digital camera 100 and the PC 200 due to occurrence of a plurality of events.

In the present embodiment, the controller 135 controls the USB connector 155 not to transmit to the PC 200 for a thinned event occurring within a thinning interval (YES in S3A, YES in S3B), and to transmit to the PC 200 for each event occurring at a thinning interval (NO in S3A, NO in S3B) (S6, S433, S433A). Therefore, it is possible to reduce the communication load between the digital camera 100 and the PC 200 due to the occurrence of a plurality of events, while notifying the PC 200 of a changed camera state corresponding to the event of which the notification data is transmitted.

In the present embodiment, the thinning interval is set to at least one of a time interval and a ratio of the number of times of occurrence of an event. In the present embodiment, in the thinning setting data D50 illustrated in FIG. 19, either the time interval or the ratio of the number of times of occurrence can be set as the thinning interval for each type of event. Only one value may be stored in the thinning type of the thinning setting data D50, and the same type of thinning interval may be set for all the thinning target events.

In the present embodiment, the USB connector 155 receives a command for setting a thinning interval from the PC 200 (S351, S352). In accordance with the command received by the USB connector 155, the controller 135 controls the USB connector 155 to restrict the transmission of the notification data to the specific event occurring at the thinning interval set by the command (S431 to S433A). Thus, the event notification can be restricted based on the thinning interval set from the PC 200.

In the present embodiment, the digital camera 100 further includes the buffer memory 125 (an example of a storage) that stores event data indicating a camera state regarding the aperture value before a change in the digital camera 100 (an example of a first state). The first state corresponding to, as an example of a first event for which the notification data is transmitted, the event of changing the aperture value in step S21. When the event of changing the aperture value in step S25 occurs as an example of a second event after the first event by the thinning interval, the controller 135 determines, based on the event data stored in the buffer memory 125, whether the camera state regarding the changed aperture value in the digital camera 100 (an example of a second state) changes from the first state, the second state corresponding to the second event (S4, S5). When the second state changes from the first state (YES in S5), the controller 135 causes the USB connector 155 to transmit notification data in response to the second event (S6). When the second state does not change from the first state (NO in S5), the controller 135 does not cause the USB connector 155 to transmit notification data in response to the second event. Accordingly, even when an event occurs at a thinning interval, in a case where the camera state does not change from the time of the previous notification of the event, the notification data is not transmitted, therefore the communication load between the digital camera 100 and the PC 200 can be further reduced.

The PC 200 is an example of a control device to which information is notified from the external digital camera 100 (an example of an imaging apparatus). The PC 200 includes the device I/F 255 (an example of a communication circuitry) and the controller 235 (an example of a control circuitry). The device I/F 255 performs data communication with the digital camera 100. The controller 235 controls an operation to receive notification data from the digital camera 100 via the device I/F 255 in response to an event that a camera state (a state of the digital camera 100) changes (S431 to S433A). The controller 235 transmits a command for setting a thinning interval to the digital camera 100 via the device I/F 255 (S351, S352). The thinning interval is an interval for restricting transmission of notification data. The controller 235 receives, from the digital camera 100 via the device I/F 255, notification data restricted to a specific event (steps S431 to S433A), the specific event occurring at a thinning interval among a plurality of events occurring in the digital camera 100 (steps S21 to S25).

According to the PC 200 described above, the event notification is restricted in accordance with the command for setting the thinning interval transmitted to the digital camera 100. Therefore, a desired thinning interval or the like can be set from the PC 200, and the event notification operation from the digital camera 100 can be controlled, for example.

The present embodiment provides a communication method for notifying the PC 200 (an example of a control device) of information in the digital camera 100 from the digital camera 100 (an example of an imaging apparatus). The present method includes transmitting, by the PC 200, to the digital camera 100, a command for setting a thinning interval restricting transmission of notification data in response to an event that a camera state (an example of a state of the digital camera 100) changes (S351, S352), and transmitting, by the digital camera 100, notification data to the PC 200 with restricting to a specific event, based on the thinning interval set by the command (S6, S431 to S432), the specific event occurring at the thinning interval (NO in S3A, NO in S3B) among a plurality of events (S21 to S25) occurring in the digital camera 100.

According to the above communication method, it is possible to reduce the processing load in the data communication for notifying the PC 200 of the change in the camera state regarding the plurality of events that occur in the digital camera 100.

Third Embodiment

Hereinafter, a third embodiment of the present disclosure will be described with reference to FIG. 21. In a third embodiment, an imaging system 1 that restricts the types of events to be notified as in the first embodiment and thins out event notifications as in the second embodiment will be described.

Hereinafter, description of configurations and operations similar to those of the imaging system 1 according to the first and second embodiments will be omitted as appropriate, and an imaging system 1 according to the present embodiment will be described.

FIG. 21 is a flowchart illustrating an event notification operation in the digital camera 100 of the present embodiment. The digital camera 100 of the present embodiment not only performs processing similar to the thinning control (S0 to S6) of the second embodiment (FIG. 20), but also performs processing notifying the PC 200 only a specific event as illustrated in FIG. 21 (S11), for example.

For example, when an event is detected (YES in S0), the controller 135 determines whether the event is included in the setting data D1 (see FIG. 7) for the event notification (S11). For example, the controller 135 determines whether the detected event is set in the notification event tag of the event group in the setting data D1 (S11).

When the detected event is in the setting data D1 for the event notification (YES in S11), the controller 135 determines a thinning type of the event (S2) with reference to the thinning setting data D50, and performs thinning control similar to that in FIG. 20, for example.

On the other hand, when the detected event is not in the setting data D1 for the event notification (NO in S11), the controller 135 ends the processing of this flowchart without performing the processing in and after step S2 and subsequent steps, for example. Therefore, even when an event not included in the setting data D1 occurs, an event notification can be prevented from being generated.

According to the above processing, only for the event set as the notification target in the setting data D1 (YES in S11), the event notification operation restricting the notification by the thinning interval is performed (S2 to S6). Therefore, in the imaging system 1, it is possible to transmit notification data to the PC 200 for a specific event set as a notification target by the user while suppressing the frequent occurrence of event notifications in the digital camera 100, for example.

The notification data transmitted in step S6 is not limited to an event of one type, and may include event data of events of a plurality of types. In this case, the controller 135 may perform the processing in and after step S2 for an event of each type. Furthermore, thinning control may be performed for each event group which is set by the setting data D1, and in steps S3A and S3B, a timer variable or a counter may be managed for each event group, for example. In this case, the elapse of the time interval (S3A) or the number of times (S3B) may be determined according to the occurrence of any event in the event group. Similarly, in steps S4 to S5, when the camera state changes with respect to any event in the event group, it may be determined that there is a difference from the previous time (YES in S5).

Furthermore, the processing of FIG. 21 may be performed using not only the event group in the setting data D1 similar to that of the first embodiment, but also using a group in which events of similar types set in the digital camera 100, such as events of a plurality of types related to the AF control.

As described above, in the present embodiment, the controller 135 (an example of a control circuitry) causes the USB connector 155 (an example of a communication circuitry) to transmit the notification data (S6) when a predetermined event occurs in the digital camera 100 (an example of an imaging apparatus), the predetermined event having a preset type (YES in S11), and does not cause the USB connector 155 to transmit the notification data when a different event occurs in the digital camera 100 occurs, the different event having a type different from the preset type (NO in S11). Therefore, in addition to the restriction of the event notification based on the thinning interval, the notification can be restricted depending on the type of event, and the processing load on the communication between the digital camera 100 and the PC 200 due to the change in the camera state can be further reduced.

Other Embodiments

As described above, the first to third embodiments are described as an example of the technology in the present disclosure. To this extent, the attached drawings and detailed descriptions are provided. However, the technique of the present disclosure is not limited thereto, and is also applicable to embodiments obtained by appropriately performing changes, replacements, additions, omissions, and the like. In addition, it is possible to combine the respective constituent elements described in the above-described embodiments to obtain a new embodiment.

In the first embodiment described above, an example is described in which, in accordance with the setting for the event notification, (1) a plurality of events are collectively notified by each event group, (2) only the event set in each event group is selectively notified, and (3) event data is stored in the event notification. The imaging system of the present embodiment may include only any one or two of the functions listed in the above (1) to (3).

In the second embodiment described above, an example is described in which the notification data including the event data is transmitted to the PC 200 when the event notification is performed (S431 to S433A) as in the first embodiment. In the present embodiment, in each of steps S431 to S433A, the digital camera 100 may transmit only the event notification, for example. In this case, as in the LV image acquisition processing (S400) in FIG. 4, the digital camera 100 may transmit the event data in response to a request from the PC 200 for acquiring the event data that has received the event notification.

In each of the above embodiments, an example is described in which communication between the digital camera 100 and the PC 200 is performed by connection between the USB connector 155 and the device I/F 255 in conformity with the USB standard. The communication between the digital camera 100 and the PC 200 is not limited to the communication in the USB standard, and can be realized by using various communication standards. In the present embodiment, not only the USE connector 155 and the device I/F 255 but also, the Wi-Fi module 165 and the network I/F 265 may perform communication conforming to IEEE 802.3, the Wi-Fi standard, or the like, for example. Furthermore, the communication between the digital camera 100 and the PC 200 may be realized by connecting the USE connector 155 and the network I/F 265 via a USE-LAN adapter, for example.

In addition, in the present embodiment, the setting data for the event notification is not limited to three events in each event group, but may include four or more events in a data structure similar to the setting data D1 illustrated in FIG. 7.

In each of the above embodiments, an example is described in which communication is performed between one digital camera 100 and the PC 200 in the imaging system 1. In the present embodiment, in the imaging system, communication may be performed between a plurality of digital cameras and the PC 200. In this case, when an event that occurs in each digital camera is notified to the PC 200 and the event is acquired, it is assumed that the processing load further increases in the controller 235 of the PC 200. Even in such a case, the processing load of the PC 200 can be reduced by performing event notification set similarly to each of the above embodiments between each digital camera and the PC 200, for example.

In each of the above embodiments, in the imaging system 1, the LV operation is described as an example of the operation in which the delay can be a problem due to the increase in the processing load accompanying the occurrence of the event in the digital camera 100. In the imaging system of the present embodiment, the LV operation may not be performed, and other operations may be performed.

In each of the above embodiments, the digital camera 100 and the PC 200 are described as examples of the imaging apparatus and the control device, respectively. In the present embodiment, the imaging apparatus and the control device are not limited thereto, and may be various electronic devices each having an image capturing function and a communication function capable of performing data communication with each other. For example, the imaging apparatus may be a video camera, and the control device may be a smartphone or a tablet computer. Furthermore, the imaging apparatus and the control device may be the same type of electronic device each having an image capturing function. The present disclosure is applicable not only to an imaging apparatus having an imaging function but also to various communication devices that notify an external control device of information in the communication devices.

In each of the above embodiments, the digital camera 100 is described as an example of the imaging apparatus. In the present embodiment, the imaging apparatus is not limited to the digital camera, and may be an electronic device having an image capturing function and a communication function. For example, the imaging apparatus may be configured as a video camera, a smartphone, a tablet computer, or the like.

As described above, the above-described embodiments are described as examples of techniques in the present disclosure. To this extent, the attached drawings and detailed descriptions are provided. Therefore, components described in the attached drawings and the detailed description include not only components indispensable to solve the problem, but may also include components not necessarily indispensable to solve the problem in order to provide examples of the techniques. Therefore, those components not necessarily indispensable should not be deemed essential due to the mere fact that those components not necessarily indispensable are described in the attached drawings and the detailed description.

The present disclosure is applicable to an imaging apparatus and a control device capable of performing data communication with each other.

The invention claimed is:

1. An imaging apparatus configured to notify an external control device of information in the imaging apparatus, the imaging apparatus comprising:
   a communication circuitry configured to perform data communication with the external control device; and
   a control circuitry configured to generate corresponding notification data in response to each of a plurality of types of events and control the communication circuitry to transmit the notification data to the external control device separately from image data, each of the events indicating that a state in the imaging apparatus changes,
   wherein the notification data includes a data storage region configured to store data indicating the state of the corresponding event, and
   the data indicating the state includes at least a first type of information in combination with a second type of information which change different respective parameters in shooting an image or recording the image in the imaging apparatus.

2. The imaging apparatus according to claim 1, wherein the control circuitry is configured to:
   generate the notification data when the event is caused in the imaging apparatus,
   store the data of the caused event in the data storage region in the generated notification data, and
   control the communication circuitry to transmit the notification data to the control device, the notification data storing the data of the caused event.

3. The imaging apparatus according to claim 1, wherein the control circuitry is configured to, when a plurality of types of events is caused in the imaging apparatus, generate one piece of notification data storing each data of a plurality of types of caused events, the data being stored in the data storage region, and
   control the communication circuitry to transmit the one piece of notification data to the control device.

4. The imaging apparatus according to claim 1,
   wherein a type of event for which the data can be stored in the data storage region is set in advance, and
   wherein the control circuitry is configured to cause the communication circuitry:
   to transmit the notification data when a predetermined event occurs in the imaging apparatus, the predetermined event having the set type, and
   not to cause the communication circuitry to transmit the notification data when a different event occurs in the imaging apparatus, the different event having a type different from the set type.

5. The imaging apparatus according to claim 3, further comprising an operation interface configured to receive a user operation setting a type of event for which the data can be stored in the data storage region.

6. The imaging apparatus according to claim 3, wherein the communication circuitry is configured to receive setting data from the control device, the setting data defining a type of event for which data can be stored in the data storage region.

7. The imaging apparatus according to claim 1, wherein the notification data further includes an event identifier that indicates a type of event for which the data is stored in the data storage region.

8. The imaging apparatus according to claim 1, wherein the imaging apparatus is configured to capture an image to generate image data, wherein the event is a change in a state of at least one of a focus state, an exposure state, a recording state, or an operation state by a user of the imaging apparatus for image capturing in the imaging apparatus.

9. The imaging apparatus according to claim 8, wherein the control circuitry is configured to control transmission of the notification data in response to the event occurring in the imaging apparatus when the image data being captured is sequentially transmitted via the communication circuitry to the control device.

10. The imaging apparatus according to claim 1, wherein the control circuitry is configured to control the communication circuitry to perform data communication with the control device in accordance with Picture Transfer Protocol (PTP).

11. A control device configured to be notified of information from an external imaging apparatus, the control device comprising:
   a communication circuitry configured to perform data communication with the external imaging apparatus; and
   a control circuitry configured to control an operation to receive corresponding notification data from the external imaging apparatus via the communication circuitry in response to each of a plurality of type of events, the notification data being transmitted separately from image data, each of the events indicating that a state in the external imaging apparatus changes,
   wherein the notification data includes a data storage region configured to store data indicating the state of the corresponding event,
   the data indicating the state includes at least a first type of information in combination with a second type of information which change different respective parameters in shooting an image or recoding the image in the imaging apparatus, and
   wherein the control circuitry is configured to set setting data defining a type of event for which data can be stored in the data storage region in the notification data,
   and transmit the set setting data to the external imaging apparatus via the communication circuitry.

* * * * *